United States Patent
Zaima et al.

(10) Patent No.: US 7,071,942 B2
(45) Date of Patent: Jul. 4, 2006

(54) DEVICE FOR EDITING ANIMATING, METHOD FOR EDITIN ANIMATION, PROGRAM FOR EDITING ANIMATION, RECORDED MEDIUM WHERE COMPUTER PROGRAM FOR EDITING ANIMATION IS RECORDED

(75) Inventors: Hiroaki Zaima, Tenri (JP); Tadahide Shibao, Takaishi (JP)

(73) Assignee: Sharp Kabushiki Kaisha, Osaka (JP)

( * ) Notice: Subject to any disclaimer, the term of this patent is extended or adjusted under 35 U.S.C. 154(b) by 289 days.

(21) Appl. No.: 10/296,906

(22) PCT Filed: May 22, 2001

(86) PCT No.: PCT/JP01/04292

§ 371 (c)(1),
(2), (4) Date: Nov. 27, 2002

(87) PCT Pub. No.: WO01/93206

PCT Pub. Date: Dec. 6, 2001

(65) Prior Publication Data
US 2003/0164847 A1    Sep. 4, 2003

(30) Foreign Application Priority Data
May 31, 2000   (JP) .............................. 2000-163286

(51) Int. Cl.
*G06T 15/70* (2006.01)

(52) U.S. Cl. ...................... 345/473; 345/474; 715/723; 352/38

(58) Field of Classification Search ................ 345/473, 345/474, 475, 629; 715/723; 352/38
See application file for complete search history.

(56) References Cited

U.S. PATENT DOCUMENTS

| | | | |
|---|---|---|---|
| 5,764,241 A | * | 6/1998 | Elliott et al. ................ 345/473 |
| 6,442,523 B1 | * | 8/2002 | Siegel ........................ 704/270 |
| 6,819,394 B1 | * | 11/2004 | Nomura et al. .............. 352/38 |

FOREIGN PATENT DOCUMENTS

| | | |
|---|---|---|
| JP | 2-216588 A | 8/1990 |
| JP | 7-44729 A | 2/1995 |
| JP | 9-167251 A | 6/1997 |
| JP | 2001-195604 | 7/2001 |

OTHER PUBLICATIONS

Kataoka, Standard XML Perfect Explanation, Gijustu-Hyoron Co., Ltd, XM: /SGML Salon, May 15, 1998, pp. 9-12 and 19-21 (with partial English language translation and statement of relevance).

(Continued)

*Primary Examiner*—Kimbinh T. Nguyen
(74) *Attorney, Agent, or Firm*—Birch, Stewart, Kolasch & Birch, LLP

(57) ABSTRACT

When a point (parameter) to be edited is judged to be present in the shape or moving state of an object (to be displayed) during reproduction of animation, the user selects the object on the screen (S201–204). Varying parameters (variation parameters; position, and the like) of the object are extracted during the reproduction of the animation and displayed on another display screen. The animation can be corrected by stopping it at a part to be edited and correcting the values of the displayed variation parameters (S205–208). Since the variation parameters can be extracted and the animation can be edited, edition of animation is facilitated.

21 Claims, 18 Drawing Sheets

OTHER PUBLICATIONS

Bowler et al., Scalable Vector Graphics (SVG) 1.0 specifcation;—W3C Recommendation, Sep. 4, 2001, Chapter 19 (http://www.w3.org/TR/SVG/).

Bugaj et al., Synchronized Multimedia Integration Language (SMIL) 1.0 Specification, W3C Recommendation, Jun. 15, 1998, Section 4.2 (http://w3.org/TR/REC-smil/).

* cited by examiner

FIG. 3

```
        <?xml version="1.0" encoding="shift_jis"?><アニメ>
01      <frame number="1">
02          <time>0</time>
03          <circle>
04              <position><X>2</X><Y>3</Y></position>
05              <radius>1</radius>
06          </circle>
07          <rectangular>
08              <position><X>3</X><Y>7</Y></position>
09              <height>1</height><width>1</width>
10          </rectangular>
11      </frame>
12      <frame number="2">
13          <time>1</time>
14          <circle>
15              <position><X>4</X><Y>7</Y></position>
16              <radius>1</radius>
17          </circle>
18          <rectangular>
19              <position><X>5</X><Y>1</Y></position>
20              <height>1</height><width>1</width>
21          </rectangular>
22      </frame>
23      <frame number="3">
24          <time>4</time>
25          <circle>
26              <position><X>7</X><Y>4</Y></position>
27              <radius>1</radius>
28          </circle>
29          <rectangular>
30              <position><X>8</X><Y>7</Y></position>
31              <height>1</height><width>1</width>
32          </rectangular>
33      </frame>
        </animation>
```

Lines 01–11: FRAME 1
Lines 12–22: FRAME 2
Lines 23–33: FRAME 3

| INTERVENING FRAME | <position><X>6</X><Y>4</Y></position> |

FIG. 11

```
23  <frame number="3">
24      <time>3</time>
25      <circle>
26          <position><X>6</X><Y>4</Y></position>
27          <radius>1</radius>
28      </circle>
29      <rectangular>
30          <position><X>7</X><Y>5</Y></position>
31          <height>1</height><width>1</width>
32      </rectangular>
33  </frame>
34  <frame number="4">
35      <time>4</time>
36      <circle>
37          <position><X>7</X><Y>4</Y></position>
38          <radius>1</radius>
39      </circle>
40      <rectangular>
41          <position><X>8</X><Y>7</Y></position>
42          <height>1</height><width>1</width>
43      </rectangular>
44  </frame>
```

FIG. 13

```
   <?xml version="1.0" encoding="shift_jis"?><animation>
01 <frame number="1">
02     <time>0</time>
03     <circle>
04         <position><X>2</X><Y>3</Y></position>
05         <radius>1</radius>
06     </circle>
07     <rectangular>
08         <position><X>2</X><Y>3</Y></position>
09         <height>1</height><width>1</width>
10     </rectangular>
11 </frame>
12 <frame number="2">
13     <time>1</time>
14     <circle>
15         <position><X>4</X><Y>7</Y></position>
16         <radius>1</radius>
17     </circle>
18     <rectangular>
19         <position><X>4</X><Y>7</Y></position>
20         <height>1</height><width>1</width>
21     </rectangular>
22 </frame>
23 <frame number="3">
24     <time>4</time>
25     <circle>
26         <position><X>7</X><Y>4</Y></position>
27         <radius>1</radius>
28     </circle>
29     <rectangular>
30         <position><X>7</X><Y>4</Y></position>
31         <height>1</height><width>1</width>
32     </rectangular>
33 </frame>
   </animation>
```

| DIFFERENCE INFORMATION | |
|---|---|
| 1~2 | \<position>\<X>+2\</X>\<Y>+4\</Y>\</position> |
| 2~3 | \<position>\<X>+3\</X>\<Y>-3\</Y>\</position> |

```
        <?xml version="1.0" encoding="shift_jis"?><animation>
01   <frame number="1">
02       <time>0</time>
03       <circle>
04           <position><X>2</X><Y>3</Y></position>
05           <radius>1</radius>
06       </circle>
07       <rectangular>
08           <position><X>3</X><Y>7</Y></position>
09           <height>1</height><width>1</width>
10       </rectangular>
11   </frame>
12   <frame number="2">
13       <time>1</time>
14       <circle>
15           <position><X>4</X><Y>7</Y></position>
16           <radius>1</radius>
17       </circle>
18       <rectangular>
19           <position><X>5</X><Y>1</Y></position>
20           <height>1</height><width>1</width>
21       </rectangular>
22   </frame>
23   <frame number="3">
24       <time>4</time>
25       <circle>
26           <position><X>7</X><Y>4</Y></position>
27           <radius>1</radius>
28       </circle>
29       <rectangular>
30           <position><X>8</X><Y>8</Y></position>
31           <height>1</height><width>1</width>
32       </rectangular>
33   </frame>
     </animation>
```

FIG. 18

```
   <?xml version="1.0" encoding="shift_jis"?><animation>
01 <frame number="1">
02     <time>0</time>
03     <circle>
04         <position><X>2</X><Y>3</Y></position>
05         <radius>1</radius>
06     </circle>
07     <rectangular>
08         <position><X>3</X><Y>7</Y></position>
09         <height>1</height><width>1</width>
10     </rectangular>
11 </frame>
12 <frame number="2">
13     <time>1</time>
14     <circle>
15         <position><X>4</X><Y>7</Y></position>
16         <radius>1</radius>
17     </circle>
18     <rectangular>
19         <position><X>5</X><Y>1</Y></position>
20     <height>1</height><width>1</width>
21     </rectangular>
22 </frame>
23 <frame number="3">
24     <time>3</time>
25     <circle>
26         <position><X>7</X><Y>4</Y></position>
27         <radius>1</radius>
28     </circle>
29     <rectangular>
30         <position><X>7</X><Y>6</Y></position>
31         <height>1</height><width>1</width>
32     </rectangular>
33 </frame>
34 <frame number="4">
35     <time>4</time>
36     <circle>
37         <position><X>7</X><Y>4</Y></position>
38         <radius>1</radius>
39     </circle>
40     <rectangular>
41         <position><X>9</X><Y>3</Y></position>
42         <height>1</height><width>1</width>
43     </rectangular>
44 </frame>
45 <frame number="5">
46     <time>5</time>
47     <circle>
48         <position><X>7</X><Y>4</Y></position>
49         <radius>1</radius>
50     </circle>
51     <rectangular>
52         <position><X>10</X><Y>2</Y></position>
53         <height>1</height><width>1</width>
54     </rectangular>
55 </frame>
   </animation>
```

FIG. 21

```
<?xml version="1.0" standalone="no"?>
<!DOCTYPE svg PUBLIC"-//W3C//DTD SVG 20001102//EN"
"http://www.w3.org/TR/2000/CR-SVG-20001102/DTD/svg-20001102.dtd">
<svg width="8cm" height="3cm" viewBox="0 0 800 300">
<rect id="RectElement" x="300" y="100" width="300" height="100"
style="fill:rgb(255,255,0)">
<animate attributeName="x" attributeType="XML"
begin="0s" dur="9s" fill="freeze" from="300" to="0" />
<animate attributeName="y" attributeType="XML"
begin="0s" dur="9s" fill="freeze" from="100" to="0" />
<animate attributeName="width" attributeType="XML"
begin="0s" dur="9s" fill="freeze" from="300" to="800" />
<animate attributeName="height" attributeType="XML"
begin="0s" dur="9s" fill="freeze" from="100" to="300" />
</rect>
</svg>
```

FIG. 22

```
<par>
<audio id="a" begin="6s" src="audio1"/>
<img begin="id(a)(4s)" src="image1"/>
</par>
```

DEVICE FOR EDITING ANIMATING, METHOD FOR EDITIN ANIMATION, PROGRAM FOR EDITING ANIMATION, RECORDED MEDIUM WHERE COMPUTER PROGRAM FOR EDITING ANIMATION IS RECORDED

This application is the national phase under 35 U.S.C. § 371 of PCT International Application No. PCT/JP01/04292 which has an International filing date of May 22, 2001, which designated the United States of America.

TECHNICAL FIELD

The present invention relates to a time-varying image editing apparatus for editing (creating and/or modifying) a time-varying image by using a prescription data, a time-varying image editing method, a time-varying image editing program, and a recording medium storing thereon a computer program for editing process of the time-varying image, for use in the time-varying image editing apparatus.

BACKGROUND ART

Conventionally, animation creating apparatuses capable of creating an animation (time-varying image) using computer graphics.

Such animation generation apparatuses create an animation in accordance with data (animation prescription data) for prescribing an object in terms of its shape and movement in the time-varying image.

For example, reference (1) "Tokukaihei No. 7-44729 (Japanese Publication of Unexamined Patent Application, Date of Release: Feb. 14, 1995)" describes a CAD system (Computer-Aided Design system) for creating an animation by using an object-oriented program.

The system is so established that animation prescription data, which is in accordance with a kind of parts or a kind of movement of an apparatus to be an object of design (object), is inputted dialogically by selecting an instance (an example of the animation prescription data) stipulated in the object-oriented program.

Moreover, reference (2) "Tokukaihei No. 9-167251 (Japanese Publication of Unexamined Patent Application, Date of Release: Jun. 24, 1997)" discloses a CAD system in which a natural language (a language using expressions used in general sentences) as animation prescription data.

The system is so established that a sentence in the natural language inputted as the animation prescription data is analyzed so as to recognize words constituting the sentence, and relationship between the words, so that an animation is created by selecting, in accordance with the recognized words, a command for use in an animation regarding a shape or movement of an object. Here, the command is an indication language (reproduction engine-use language) for driving a reproduction engine for the animation.

However, in the system of reference (1), it is necessary to create and register a new instance in accordance with the object-oriented program, in order to set animation prescription data to other data that is not registered as an instance, for prescribing the object in terms of the movement or a change in the shape.

Moreover, in the system of reference (2), it is also necessary to create a new command and register the command in accordance with the natural language, in order to modify the object in terms of the movement and the change in the shape.

As described above, in those systems, it is necessary to create and register a new instance or command in order to modify, as requested by a user, the object in the animation in terms or the movement and the change in the shape. After the new instance or command is registered, the data is inputted by using the instance or the natural language.

Because of this, it is difficult to simplify the creation and modification process (editing process) and to shorten time period necessary for the creation and modification process (editing process).

DISCLOSURE OF INVENTION

The present invention has an object to provide a time-varying image editing apparatus capable of performing an editing process of a time-varying image with ease.

In order to attain the aforementioned object, a time-varying image editing apparatus (present editing apparatus) of the present invention for editing a time-varying image by using prescription data including a parameter that prescribes a condition of an object in the time-varying image, is provided with an input section for receiving a user instruction; an extracting section for extracting, from the prescription data, a varying parameter that regards a change in the condition of the object in the time-varying image; and a modifying section for modifying the thus extracted varying parameter in accordance with the user instruction, and updating the prescription data by using the thus modified varying parameter.

The present editing apparatus is an apparatus for editing a time-varying image (animation) by using a computer graphics.

Generally, it is so arranged that the time-varying image is created in accordance with data that prescribes a shape or movement of an object in the image (an object displayed in the image; character). The present editing apparatus is so arranged as to edit the time-varying image by using the prescription data.

Especially, the present editing apparatus is so arranged as to use the extracting section to extract the varying parameter regarding the change in the condition of the object in the time-varying image.

Specifically, parameters that prescribe a shape, movement, a color or the like of the respective objects are generally written in the prescription data. Moreover, some of the parameters of the objects are changed in accordance with the change in the condition of the objects in the time-varying image (such as positions of the objects), while others have no relation with the change, and are not to be varied (such as names of the objects). The present editing apparatus is so arranged that a parameter to be varied is extracted, as a varying parameter, from the prescription data.

Then, the modifying section modifies the extracted varying parameter in accordance with a user instruction. Further, the modifying section updates the prescription data of the time-varying image by using the thus modified varying parameter. With this arrangement, it is possible to edit the time-varying image in accordance with the user instruction.

As described above, the present editing apparatus is so established as to selectively extract only the varying parameter from the prescription data. With this arrangement, it is possible to edit the time-varying image more easily than the case where the whole prescription data is directly edited.

For a fuller understanding of the nature and advantages of the invention, reference should be made to the ensuing detailed description taken in conjunction with the accompanying drawings.

BRIEF DESCRIPTION OF DRAWINGS

FIG. 3 is an explanatory view showing an example of XML data used in the animation editing apparatus shown in FIG. 2.

FIG. 4(a) is an explanatory view showing an animation in accordance with the XML data shown in FIG. 3, while FIGS. 4(b) to 4(d) are explanatory views showing frame image data in accordance with the XML data shown in FIG. 3.

FIG. 11 is an explanatory view showing XML data in accordance with the animation illustrated in FIG. 10.

FIG. 13 is an explanatory view showing XML data in accordance with the animation shown in FIG. 12.

FIG. 16 is an explanatory view showing XML data in accordance with the animation shown in FIG. 14.

FIG. 18 is an explanatory view showing XML data in accordance with the animation shown in FIG. 17.

FIG. 21 is an explanatory view illustrating an example of SVG data.

FIG. 22 is an explanatory view illustrating an example of SMIL data.

BEST MODE FOR CARRYING OUT THE INVENTION

The present invention is explained below in further detail, by means of an embodiment. It should be noted that the embodiment is not to limit the present invention.

An animation editing apparatus (present animation editing apparatus) of a present embodiment is an apparatus for editing (creating and/or modifying) and/or reproducing an animation in accordance with data (animation prescription data) that is in accordance with a characteristic of an object in an image in terms of a shape or movement.

Here, the animation is a time-varying image obtained by continuously (sequentially) displaying a plurality of still images (still image data) per predetermined time. The present animation editing apparatus is so established that the present animation editing apparatus edits the animation by editing the still image data used in the animation.

Especially, the present animation editing apparatus is so established that text data (XML data) in the XML (Extensible Markup Language) formation can be used as animation prescription data.

The XML data, which is text data (data stipulated by a set of letter character codes), functions like data that can be directly processed by an apparatus (or application software used by the apparatus). Therefore, it can be said that the XML data is user-friendly, as well as apparatus-friendly.

Moreover, the XML data is so established that each parameter composing the data is attached with a tag whose name indicates a content of the parameter to which the tag is attached. Therefore, the user can be easily informed of the content of the data by reading the XML data.

For detailed explanation of XML, refer to literatures such as "Standard XML Perfect Explanation" (Gijutsu-Hyoron Co.Ltd., by XML/SGML salon, published on May 15, 1998).

To begin with an arrangement of the present animation editing apparatus is explained.

Figure 2:
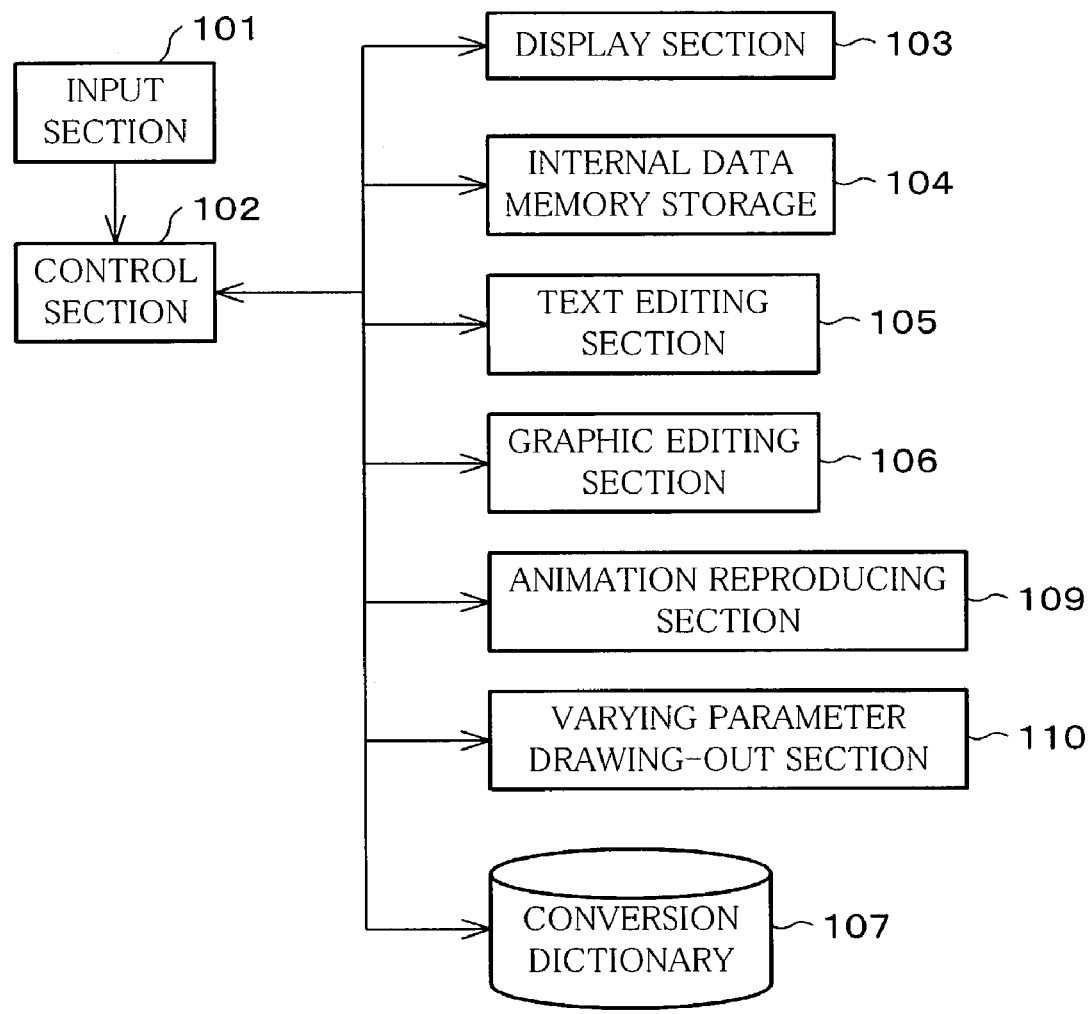
FIG. 2 is an explanatory view illustrating an arrangement of the animation editing apparatus.

As shown in FIG. 2, the present animation editing apparatus is provided with an input section 101, a control section 102, a display section 103, an internal data memory storage 104, a text editing section 105, a graphic editing section 106, a conversion dictionary 107, an animation reproducing section 109, and a varying parameter extracting section 110.

The input section (input section, object specifying section) 101 is an input apparatus provided with a keyboard suitable for inputting a text, and a mouse (both not shown), both of which are suitable for inputting and transmitting user instructions into the present animation editing apparatus.

Moreover, the input section 101 is provided with a reading apparatus (not shown) for reading a recording medium such as an FD (floppy Disc), a CD (Compact Disk), an MO (Magnetic-optical Disk), a DVD (Digital Versatile Disc). Thus, the input section 101 also has a function to read XML data (animation prescription data; prescription data) stored in those recoding media.

The display section 103, which is a monitor having a display screen made of an LCD (Liquid Crystal Display) or a CRT (Cathode-Ray Tube), is capable of displaying the XML data or later-described frame image data, an animation, and the like. Explanation on the display screen of the display section 103 will be provided later.

The internal data memory storage 104, which is composed of a recording medium such as an RAM (Random Access Memory), a hard disc or the like, retains (stores) the later described frame image data and the XML data, which is inputted via the input section 101 and edited. Note that the internal data memory storage 104 is so established as to store thereon the XML data and the frame image data in such a manner that the XML data and the frame image data are stored in correspondence with each other.

The conversion dictionary 107, which is composed of a recording medium such as an ROM (Read Only Memory), an RAM, a hard disc and the like, stores thereon a grammar (parameter) of the XML data, and a grammar of the image data (command code of the animation reproducing section (reproduction engine) 109) in such a manner that the grammar of the grammar of the XML data and the grammar of the image data are saved in correspondence with each other one to one. In short, the conversion dictionary 107 is a corresponding table for converting the XML data into the command code of the reproduction engine.

Note that the image data is data constituted of the command codes (codes for displaying an image) of the reproduction engine. Moreover, in the present invention, the expression "display of the image data" is used to mean "display of an image in accordance with the image data".

The text editing section (modifying section, prescription data display section) 105 edits, in accordance with the user instruction inputted into the input section 101, the XML data stored in the internal data memory storage 104. Moreover, the text editing section 105 has a function for displaying on the display section 103 the XML data currently being edited.

FIG. 3 is an explanatory view illustrating an example of the XML data. Shown in the example is XML data to reproduce an animation shown in FIG. 4(a). In the animation, an circle object 801 and a rectangular object 802 are moved in such a manner that respective reference points of the circle object 801 and the rectangular object 802 (a center P1 of the circuit object 801, and a corner P2 of the rectangular object 802) change from points E1, E2 to E3, and from points K1, K2 to K3.

The XML data shown in FIG. 3 is composed of a plurality of frames (key frames) 1 to 3, which correspond to E1 to E3 (K1 to K3). In the respective frames 1 to 3, written as parameters sandwiched by tags are a reproduction time (time) of each frame, a type (circle, rectangular) of the objects (object; display object) to be displayed in an animation, and values (position, radius, height, and width) to prescribe each object in terms of shapes and positions. Note that line numbers in two digits are provided on a left end in the example of the XML data shown in FIG. 3, for easy explanation.

In the XML data shown in FIG. 3, the tags are symbols prescribed by <(name of parameter)>, and </(name of parameter)>.

For example, as shown in FIG. 3, in the respective frames 1 to 3, shown as the parameters to prescribe the shape and the position of each object are values indicating the position (the position in axes X and Y) and radius of the central P1 of the circle object 801 at Times 0, 1, and 4, and the values indicating the position (the position in axes X and Y), width, and height of the corner P2 of the rectangular object 802 at Times 0, 1, and 4.

In addition, the present animation editing apparatus is capable of setting a color of an object as a parameter, besides the type, shape, position, and the like of the object.

Moreover, in FIG. 3, the tags in lines 1, 11, 12, 22, 23, and 33 show (delimiters) of frames, and thus the tags are frame tags having frame numbers as their parameters. Text data sandwiched by those frame tags are parameters of each object in the respective frames 1 to 3.

For example, in the frame 1, the number sandwiched by the time tag in line 2 is a parameter that indicates the reproduction time of the frame 1 (which indicates after how many seconds the frame 1 starts from a start of the animation).

Moreover, the circle tags in lines 3 and 6 indicate that contents in lines 2 to 5 are parameters of the circle object 801. Specifically, in the position tag in line 4, X and Y coordinates of the center P1 of the circle object 801 are described. Moreover, the radius tag in line 5 indicates the radius (cm) or the circle object 801.

Further, the rectangular tags in lines 7 and 10 indicate that the contents in lines 8 and 9 are the parameter of the rectangular object 802. In the position tag in line 8, the X and Y coordinates of the corner P2 of the rectangular object 802 are described. The height tag and the width tag in line 9 indicate the height (cm) and width (cm) of the rectangular object 802.

Moreover, the text editing section 105 shown in FIG. 2 has a function to create data (frame image data) of still images respectively corresponding to the frames of XML data by using the conversion dictionary 107, and stores the data in the internal data memory storage 104.

Specifically, the text editing section 105 is so established as to create, in accordance with the conversion dictionary 107, the frame image data that is in accordance with the tags of the XML data. In addition, a tag not listed in the conversion dictionary 107 will not be reflected to the frame image data by the text editing section 105.

Moreover, the text editing section 105 is so established that, after editing the XML data, the text editing section 105 modifies the frame image data with reference to the conversion dictionary 107 depending on how a result of the editing is.

Further, the text editing section 105 is so established that, after the later-discussed graphic editing section edits the frame image data, the text editing section 105 modifies the XML data with reference to the conversion dictionary 107 depending on how a result of the editing is.

The graphic editing section (image display section) 106 causes the display section 103 to display the frame image data thereon. Further, the graphic editing section 106 is capable of editing the frame image data in response to the user instruction inputted to the input section 101.

FIGS. 4(b) to 4(d) are explanatory views showing the frame image data for the frames 1 to 3, in the XML data shown in FIG. 3. As shown in FIGS. 4(b) to 4(d), for each frame image data, the circle object 801 and the rectangular object 802 are drawn in accordance with the shape and position parameter written in each of the frames 1 to 3 of the XML data shown in FIG. 3.

The animation reproducing section (image display section) 109 shown in FIG. 2 reads the XML data stored in the internal data memory storage 104, creates later-described animation data by using the conversion dictionary 107, and reproduces the animation data as an animation on the display section 103.

Note that the animation data is time-varying image data that is in accordance with the content of the animation prescription data such as the XML data. Specifically, the animation reproducing section 109 creates the frame image data that is in accordance with the respective frames of the XML data, and the still image data (intervening image data) for intervening frames to interpolate between the respective frames. Then, the animation reproducing section 109 is so established as to create, as animation data, data with which those still image data is displayed continuously (sequentially) per predetermined time.

The varying parameter extracting section (extracting section, varying parameter display section 110 extracts a parameter (varying parameter) varying from one frame to the other, and displays the parameter as the text data on the display section 103.

Examples of the varying parameter are the varying positions, shapes, colors, and the like of the respective objects.

The extracting process of the varying parameter by the varying parameter extracting section 110 will be described later in detail.

The control section 102 is composed of a CPU (Central Processing Unit). The control section 102 has functions to control the respective aforementioned sections of the present animation editing apparatus so as to cause the respective sections to create and modify (edit) internal data (the XML data and frame image data), and to create and reproduce the animation (the animation data). The control section 102 is a central section of the present animation editing apparatus.

Next, the display screen of the display section 103 is explained below.

Figure 5:
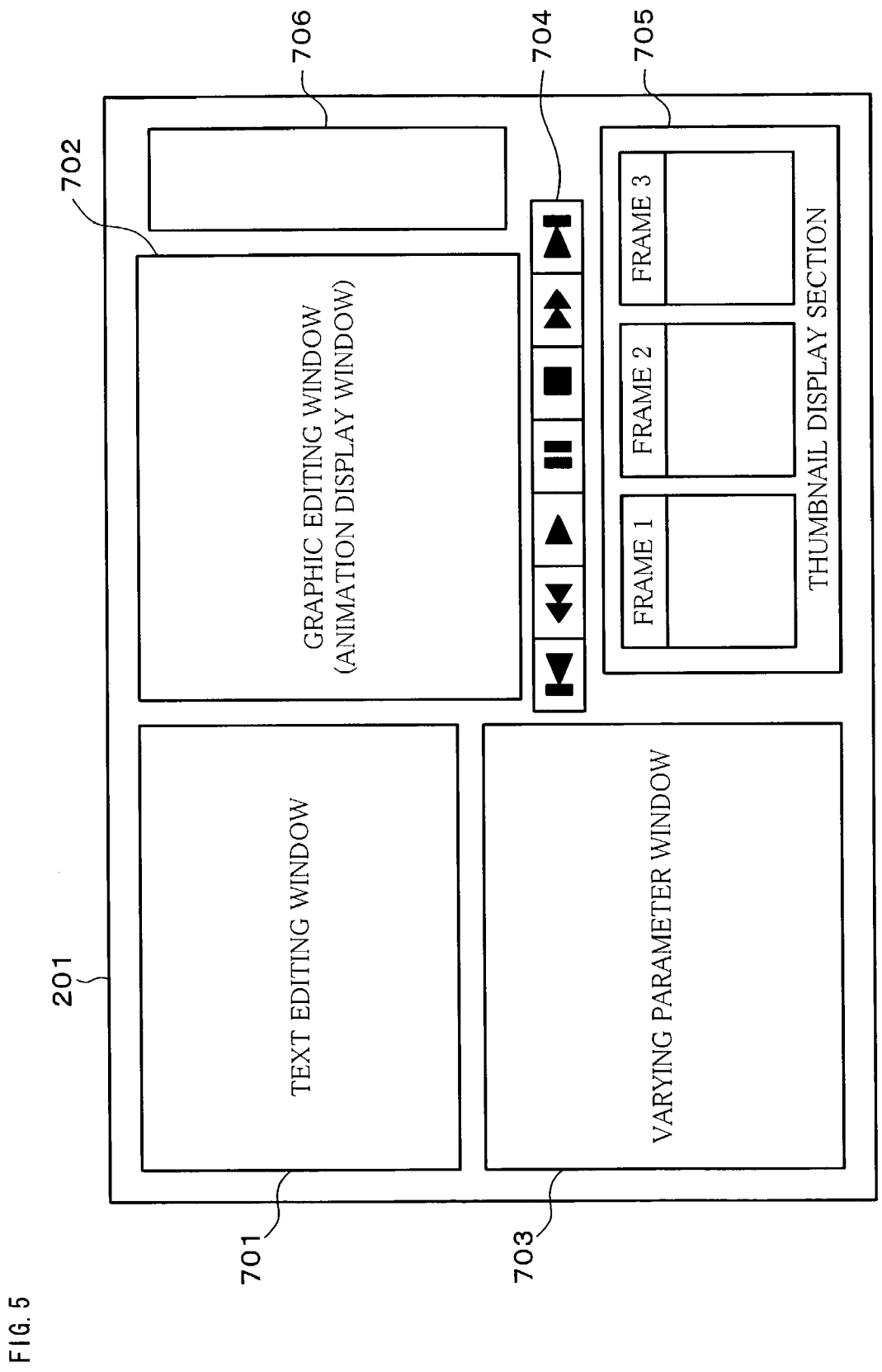
FIG. 5 is an explanatory view illustrating a display screen of a display section of the animation editing apparatus shown in FIG. 2.

FIG. 5 is an explanatory view illustrating a display screen 201 of the display section 103. As shown in FIG. 5, the display screen 201 is provided with a text editing window 701, a graphic editing window 702, a varying parameter window 703, a control button group 704, a thumbnail display section 705 and a tool bar 706.

The text editing window (prescription data display section 701 is a window for the XML data. It is possible to edit the XML data displayed on the text editing window 701 by using the input section 101 (mainly a keyboard).

The graphic editing window (image display section) 702 is a display screen to display the still image data of the frame image data and the like, and the animation. Moreover, the graphic editing window 702 is so established that it is possible to edit the displayed frame image data by means of a GUI (Graphical User Interface) by using the input section 101 (mainly a mouse).

The varying parameter window (varying parameter display section) 703 is a display screen for displaying, as text data, the varying parameter of the object specified by the editing windows 701 and 702.

The control button group 704 is provided with bottoms for reproduction, fast-forward, rewind (fast-rewind), stop, and pause. Moreover, the control button group 704 is provided with a button for switching the frame image data to be displayed, by replacing currently displayed frame image data with frame image data displayed before or after the currently displayed frame image data, in case the frame image data is displayed on the graphic editing window 702.

The thumbnail display section 705 is a display screen for displaying a thumbnail (thumbnail group) of each frame image data to be displayed on the graphic editing window 702.

The tool bar 706 is a region for displaying various tool kits for editing the frame image data displayed on the graphic editing window 702. Here, the tool kits are icon group (not shown) for drawing graphic symbols (circle, rectangular, lines, and the like) on the graphic editing window 702.

Moreover, on the tool bar 706, displayed are icons (not shown) for instructing creation of new frame image data, or for instructing deletion of the frame image data.

An example of use of the display screen 201 is explained below. For example, in case an animation, in which the center P1 of the circle object 801 moves from E1, E2 to E3 while the corner P2 of the rectangular object 802 moves from K1, K2 to K3 at the same time as shown in FIG. 4(a), is to be created, a user selects a frame number to edit (create), by using the control button group 704 or the thumbnail display section 705.

Then, the user creates the frame image data as shown in FIGS. 4(b) to (d) on the graphic editing window 702, by using the tool kits of the tool bar 706. In other words, the user places the circle object 801 respectively on E1 to E3, and the rectangular object 802 respectively on K1 to K3 in the frames 1 to 3.

By carrying out the above-described process, the frame image data of the respective frames 1 to 3 is updated (edited) by the graphic editing section 106 (see FIG. 2). After that, the text editing section 105 updates the XML data in accordance with the update and displays on the test editing window 701 the XML data corresponding to the updated frame image data.

Note that, it may be so arranged that a dialog is displayed on the graphic editing window 702, the dialog allowing the user to input, in text format, reproduction times of the respective frames 1 to 3 (alternatively, time intervals between the respective frames), so that the user specify the reproduction times.

Moreover, it may be so arranged that the thumbnail display section 705 is provided with a scroll bar for specifying (controlling) the reproduction times of the respective frames 1 to 3 (alternatively, the time intervals between the respective frames).

Next, explained is how the varying parameter extracting section 110 extracts the varying parameter.

Figure 6:
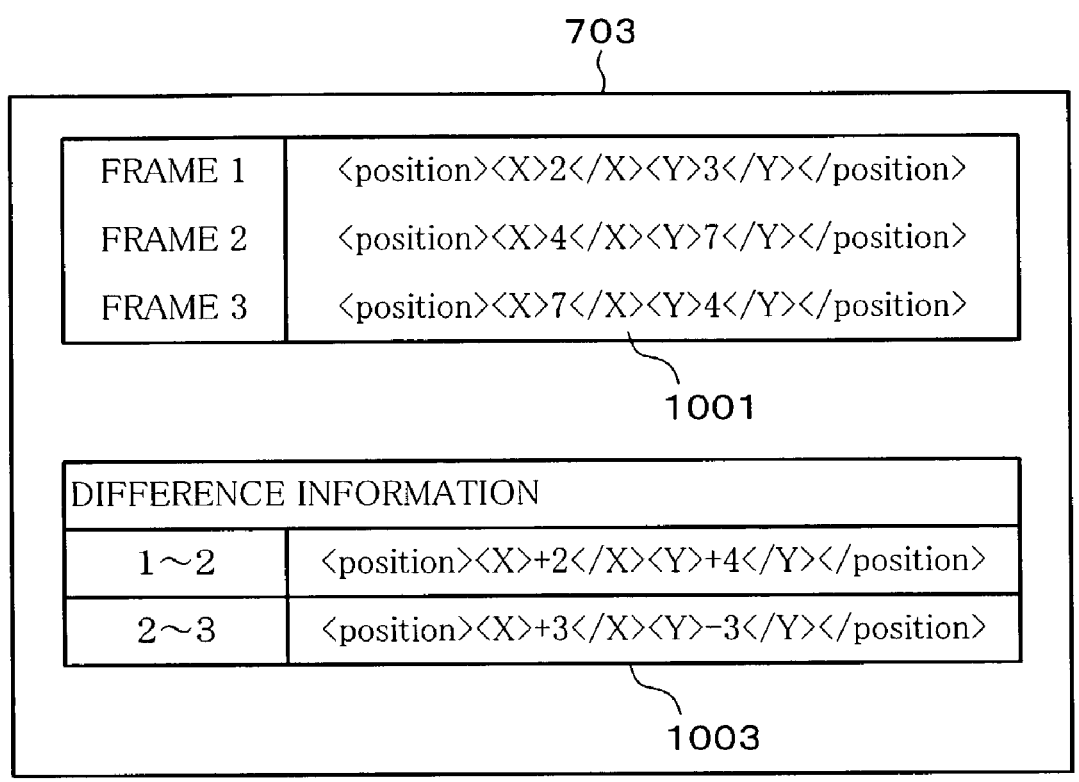
FIG. 6 is an explanatory view showing an example of a display of a varying parameter window on the display screen shown in FIG. 5.

FIG. 6 is an explanatory view illustrating an example of a display of the varying parameter window 703 on the display screen 201. In the example shown in FIG. 6, the position of the circle object 801 in the animation shown in FIG. 4(a) is extracted as varying parameter information 1001, and displayed.

The varying parameter extracting section 110 draws its attention to the circle object 801 when the circle tag of the XML data shown in FIG. 3 is selected on the text editing window 701, or when the circle object 801 is selected on the graphic editing window 702.

Then, the varying parameter extracting section 110 searches and extracts the parameter to be varied in the frames 1 to 3 (in the example of FIG. 4(a), the position of the center P1), and displays on the varying parameter window 703 the parameter as the varying parameter information 1001 constituted of text data.

Further, the varying parameter extracting section 110 extracts difference values in the varying parameter between the respective frames 1 to 3, and displays on the varying parameter window 703 the difference values as difference information 1003 constituted of text data. Here, the term "1~2" in the difference information 1003 of FIG. 6 indicates that the row relates to the difference information between the frames 1 and 2.

Figure 7:
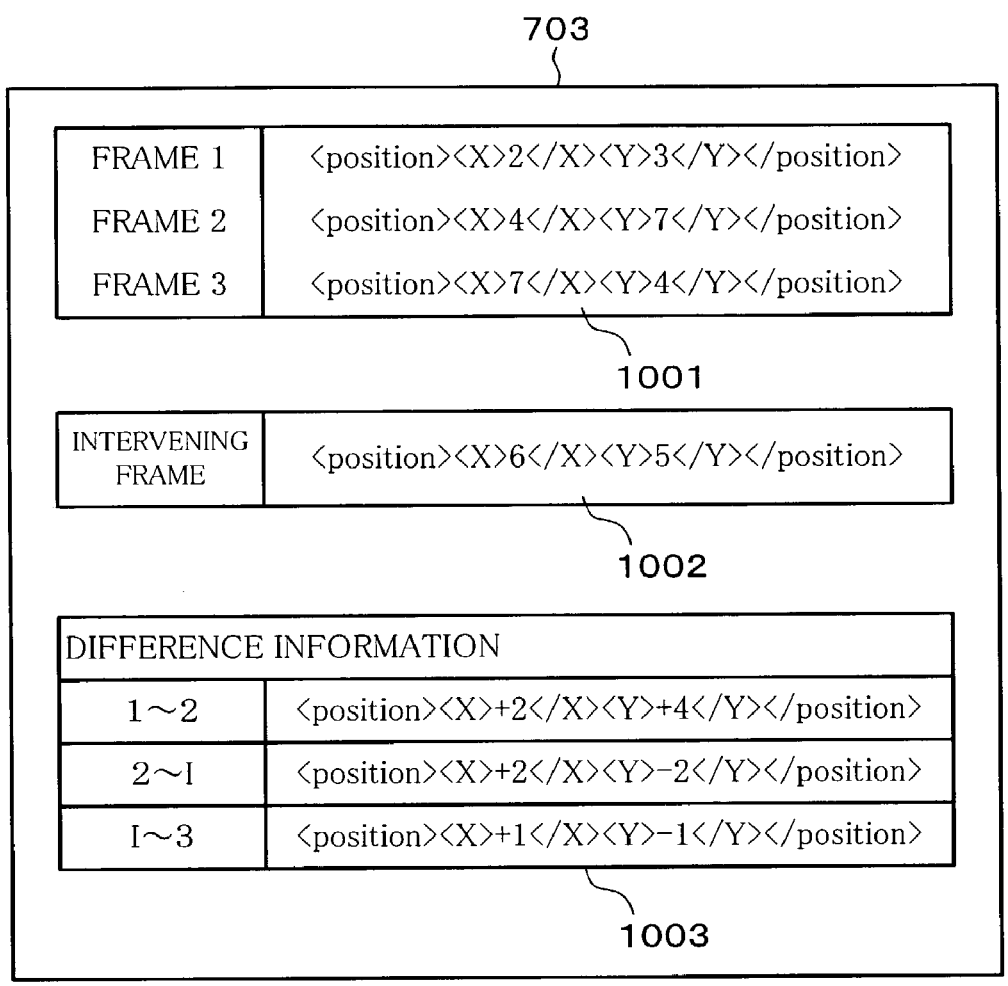
FIG. 7 is an explanatory view showing another example of display of the varying parameter window on the display screen shown in FIG. 5.

Moreover, the varying parameter extracting section 110 is so established that as shown in FIG. 7 the varying parameter extracting section 110 sequentially displays, on the varying parameter window 703, values of the varying parameter of the intervening image data (and the frame image data) that is currently being reproduced (displayed) on the graphic editing window 702), when the animation is reproduced while the circle tag (or the circle object 801) is selected, and when the circle tag is selected during the reproduction of the animation. Here, the values of the varying parameter are displayed as reproduction information 1002 in addition to the information 1001 and 1003.

Note that, as described above, the intervening image data is the still image data of the intervening frame for interpolating between the frame image data. Moreover, the term "2~I" indicates that the row relates to the difference information between the frame 2 and the intervening frame that is currently being displayed.

Figure 8:
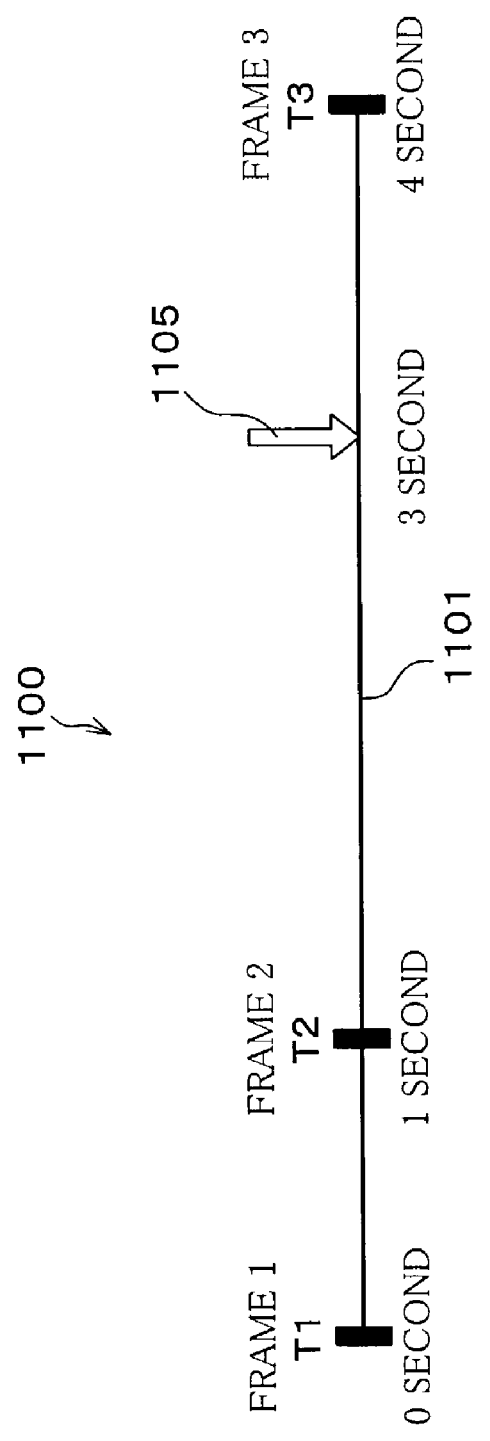
FIG. 8 is an explanatory view illustrating a reproduction timer displayed on the varying parameter window on the display screen shown in FIG. 5.

Moreover, the varying parameter extracting section 110 may display, on the varying parameter window 703, a reproduction timer 1100 as shown in FIG. 8 in the extracting process during the reproduction of the animation, in order to indicate temporal relationship among the respective frames 1 to 3, and the reproduction times of the respective frames 1 to 3.

It is so arranged that a time axis 1101, respective positions T1 to T3 of the frames 1 to 3, and a slider 1105 for indicating a position of a frame currently being displayed (including the intervening frame) are displayed on the reproduction timer 1100. The positions T1 to T3 and the slider 1105 are on the time axis 1101.

Next, explained is how the present animation editing apparatus operates.

Figure 1:
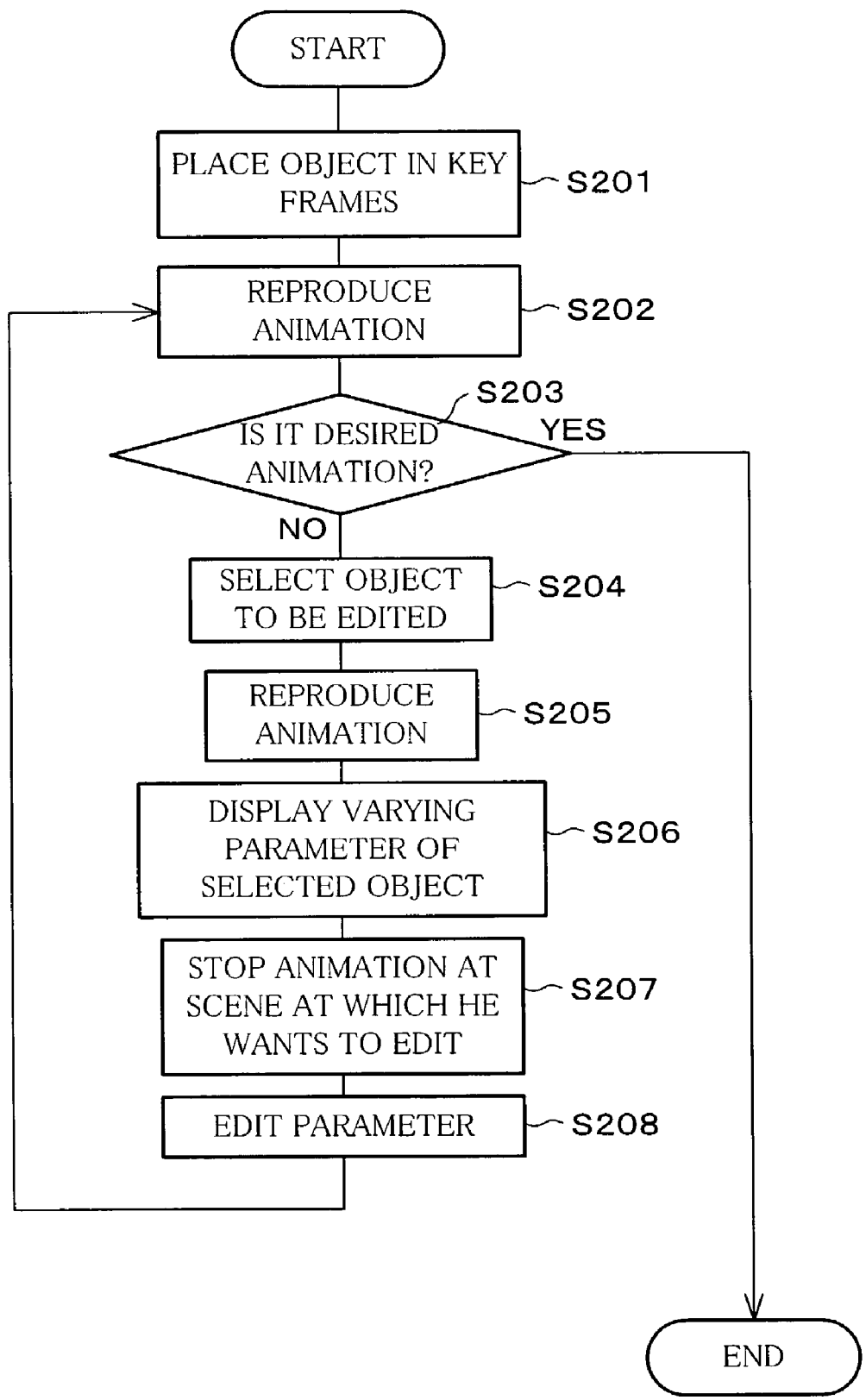
FIG. 1 is a flow chart showing how an animation editing apparatus of an embodiment of the present invention operates.

FIG. 1 is an explanatory view showing a flow of the operation of the present animation editing apparatus. Note that the process illustrated in FIG. 1 is to create the frame image data and the XML data in accordance with a user input that is done by the user, reproduce the animation in accordance with the frame image data and the XML data, and modify the XML data in accordance with a user input.

Figure 4:
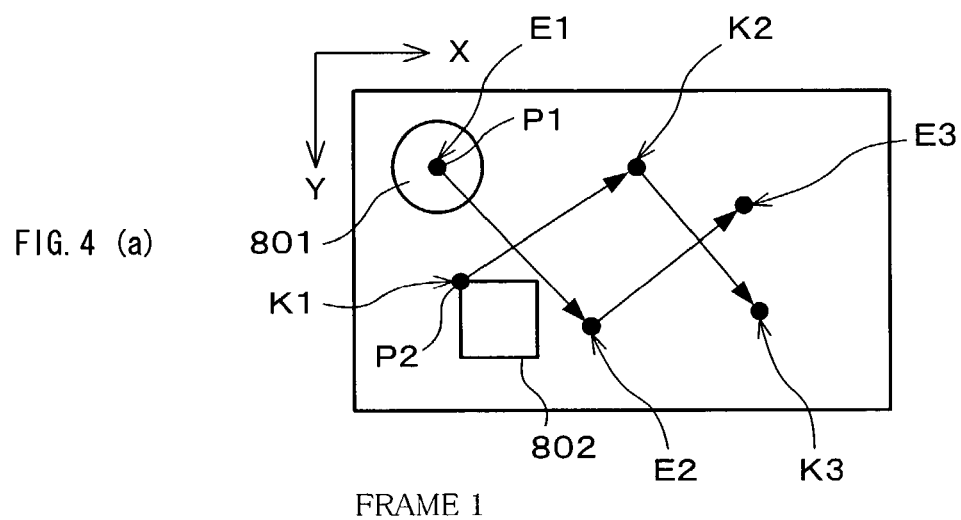
Figure 4:
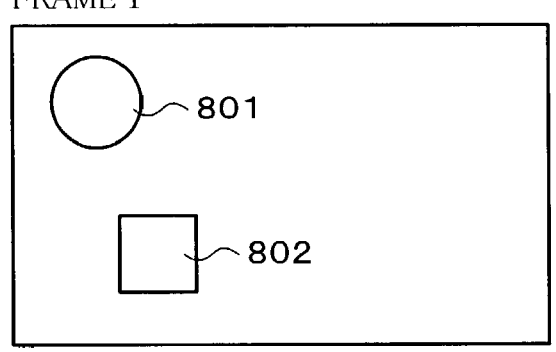
Figure 4:
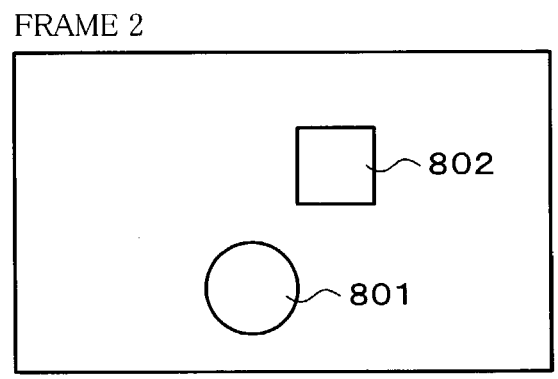
Figure 4:
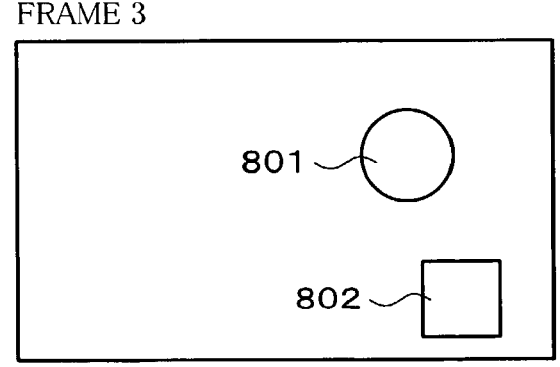

As shown in FIG. 1, by using the input section 101, the user creates and places, on the graphic editing window 702 of the display section 103, an object composed of a dot, a line, and the like, thereby editing (creating) frame image data as shown in FIGS. 4(*b*) to 4(*d*) (S201).

In response to this, the control section 102 controls the graphic editing section 106 so as to recognize the still image data as the frame image data, and causes the internal data memory storage 104 to store the thus recognized frame image data thereon.

Moreover, at this time, the control section 102 controls the text editing section 105 to create the XML data in accordance with the frame image data stored in the internal data memory storage 104, and causes the internal data memory storage 104 to store the XML data similarly.

Next the control section 102 transmits, to the animation reproducing section 109, the XML data stored in the internal data memory storage 104. Then, the control section 102 controls the animation reproducing section 109 to create animation data from the XML data, and reproduce the animation data on the graphic editing window 702 of the display section 103 (S202).

After that, the user judges whether or not the thus reproduced animation is the one desired (S203). If the animation is in accordance with what he desires, the user terminates the process.

On the other hand, if he wants to modify the animation, the user notifies, via the input section 101, the control section 102 that he wants to modify the animation. In other words, the user clicks a predetermined position with the mouse, or inputs a predetermined instruction (operation) by using a keyboard.

In response to this, the control section 103 controls the graphic editing section 106 to display one of the frame image data on the graphic editing window 702 of the display section 103.

After that, the user selects the object (object to be modified in terms of its shape and movement) by using the input section 101 (S204).

Next, the control section 102 controls the animation reproducing section 109 to reproduce the animation (S205), and controls the varying parameter extracting section 110 to extract a varying parameter of the thus selected object, and to displays the varying parameter on the varying parameter window 703 as shown in FIG. 7 (S206).

Note that at S206 the control section 102 transmits, to the varying parameter extracting section 110, XML data regarding the thus selected object. In response to this, the varying parameter extracting section 110 monitors the change in the parameter of the thus selected object in the intervening frame. Then, the varying parameter extracting section 110 detects out the parameter that is varying, and displays the parameter on the varying parameter window 703.

Next, by using the stop button of the control button group 704, the user stops the animation at a scene at which he wants to edit (S207). Then, the user edits (modifies) the value of the varying parameter (S208) by editing the varying parameter information 1001, the reproduction information 1002, or the difference information 1003, which is displayed on the varying parameter window 703. Then, the process returns to S202.

Here, an example of the editing of the varying parameter is explained.

Figures 9, 10:
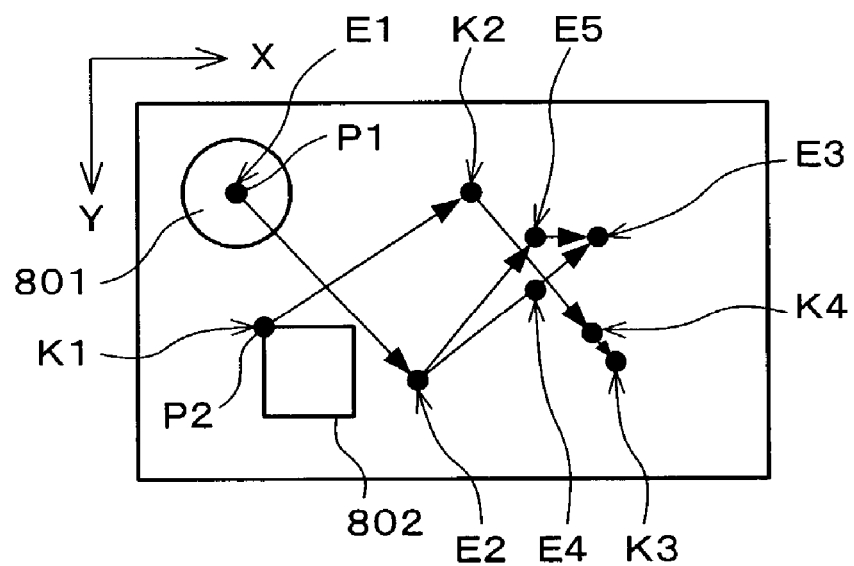
FIG. 9 is an explanatory view illustrating part of an example of display of the varying parameter window on the display screen shown in FIG. 5.
FIG. 10 is an explanatory view illustrating an animation obtained by editing the animation shown in FIG. 4(a).

Assume that an X coordinate of the reproduction information 1002 regarding the intervening frame shown in FIG. 7 is edited by the process of S208 to be a value shown on the varying parameter window 703 as shown in FIG. 9. The editing is, as shown in FIG. 10, to change the movement of the circle object 801 from E2 to E3.

Specifically, in the reproduction information 1002 shown in FIG. 7, it is so arranged that the circle P1 of the circle object 801 is positioned at E4 (see FIG. 10) at the reproduction time during which the intervening frame is reproduced. The editing is to change the position of the circle object 801 at that reproduction time to E5.

When the editing is carried out, the control section 103 controls the text editing section 105 to create a key frame in accordance with the varying parameter thus edited, and add the key frame to the XML data (change the XML data). Further, the control section 102 controls the text editing section 105 to create new frame image data that is in accordance with the thus added key frame.

FIG. 11 is an explanatory view illustrating changed portion of the XML data. The XML data after changed is identical to the XML data before changed (See FIG. 3), as to lines 1 to 22. In the changed portion shown in FIG. 11, the frame 3 of the XML data before changed is placed in lines 34 to 44 as a frame 4 (the addition of the new key frame updates frame number). In lines 23 to 33, the new key frame is inserted as a frame 3.

The newly inserted frame 3 is the key frame of Time 3, at which the intervening frame in accordance with the reproduction information 1002 shown in FIG. 7 (FIG. 9) is reproduced. Moreover, the frame 3 indicates that the circle P1 of the circle object 801 at Time 3 is placed at E5 (see FIG. 10).

Further, the frame 3 indicates that the corner P2 of the rectangular object 802 at Time 3 is placed at K4 (see FIG. 10). K4 is identical to the position of the rectangular object 802 at Time 3 of the XML data before changed.

Figure 12:
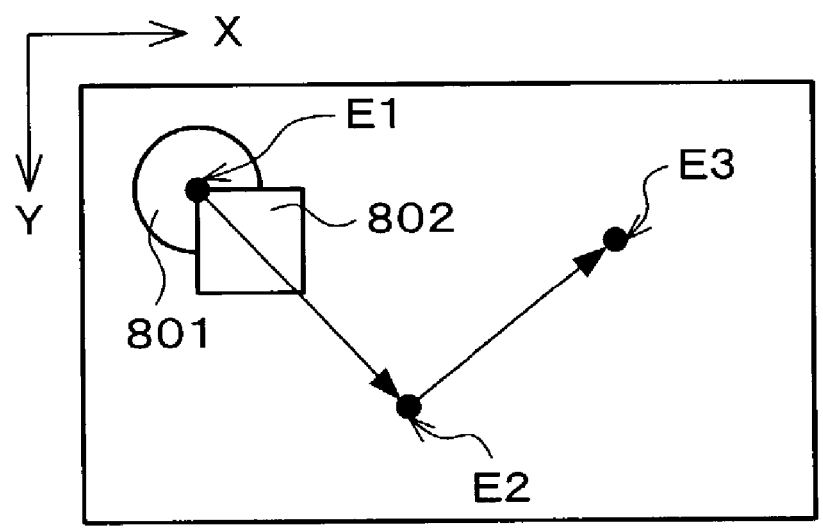
FIG. 12 is an explanatory view illustrating another animation obtained by editing the animation shown in FIG. 4(a).

Next, explained is an example where the animation shown in FIG. 4(*a*) is edited as shown in FIG. 12, specifically, the movement of the rectangular object 802 is edited to be identical to that of the circle object 801 (the example regards copying of movement).

As shown in FIG. 6 or 7, values of a position parameter of the circle object 801 are listed as the varying parameter information 1001 on the varying parameter window 703.

Thus, in order to copy the movement of the circle object 801, firstly the user copies all values of the position parameter of the circle object 801 (the whole varying parameter information 1001 shown in FIG. 6), temporarily.

Note that the copying is realized by selecting (dragging) the whole varying parameter information 1001 by the mouse or keyboard, and storing in a predetermined storing region (a clipboard (not shown) and the like; which may be the internal data storing section 104), which is controlled by the control section 102.

Thereafter, the user specifies the rectangular tag or the rectangular object 802 on the text editing window 701 or the graphic editing window 702. By doing this, the values of the position parameter of the rectangular object 802 are displayed as the varying parameter information 1001 on the varying parameter window 703.

Then, the values of the position parameter of the circle object 801 temporarily stored are pasted (overwritten) on the values of the position parameter of the rectangular object 802 displayed as the varying parameter information 1001. By doing this, the movement of the rectangular object 802 is edited to be identical to that of the circle object 801.

FIG. 13 is an explanatory view of the XML data thus edited. As shown in FIG. 13, the values of the position parameter of the circle object 801 written in lines 4, 15 and 26 are overwritten as the values of the position parameter of the rectangular object 802 in lines 8, 19, and 30, in the XML data after edited.

Figures 14, 15:
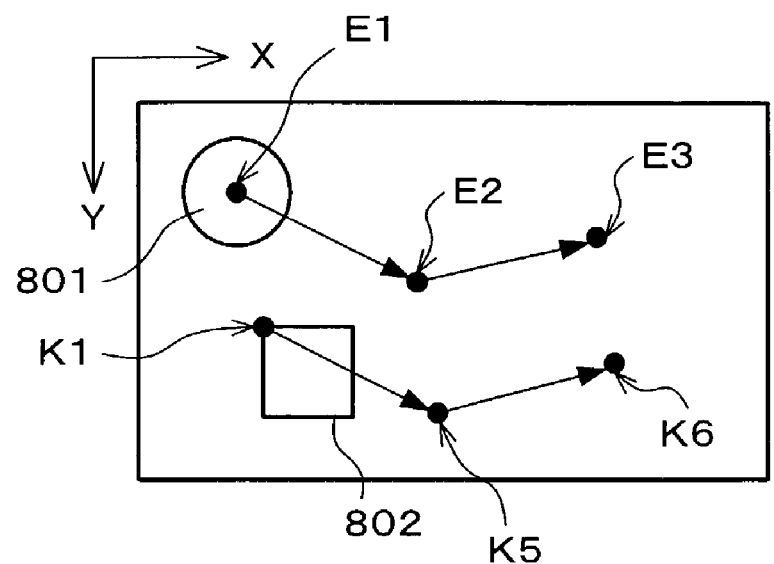
FIG. 14 is an explanatory view illustrating yet another animation obtained by editing the animation shown in FIG. 4(a).
FIG. 15 is an explanatory view illustrating differential information displayed on the varying parameter window on the display screen shown in FIG. 5.

Next, explained is an example where the animation shown in FIG. 4(*a*) is edited as shown in FIG. 14, specifically, the movement of the rectangular object 802 is edited to be parallel to that of the circle object 801 (the example regards copying of movement vector).

As shown in FIG. 6 (or 7), the difference values of the position parameter of the circle object 801 are listed (displayed side by side) as the varying parameter information 1001 on the varying parameter window 703.

Firstly, the user temporarily copies the whole difference information 1003 of the circle object 801 shown in FIG. 15. Then, the user specifies the rectangular tag or the rectangular object 802 on the editing windows 701 and 702. By doing this, the difference values of the position parameter of the rectangular object 802 as the difference information 1003 on the varying parameter window 703.

Then, the difference values of the circle object 801 temporarily stored are pasted (overwritten) on those of the rectangular object 802 displayed as the difference information 1003. By doing this, the movement of the rectangular object 802 is edited to be parallel to that of the circle object 801 (so as to move from K1, K5, to K6). In short, the movement vector (vector of action) of the rectangular object 802 is edited to be similar to that of the circle object 801.

FIG. 16 is an explanatory view of the XML data thus edited. As shown in FIG. 16, in the XML data after edited, written in lines 19 and 30 are the values, which are worked out by adding the difference values shown in FIG. 15 to the values of the position parameter of the rectangular object 802 written in line 8.

Figure 17:
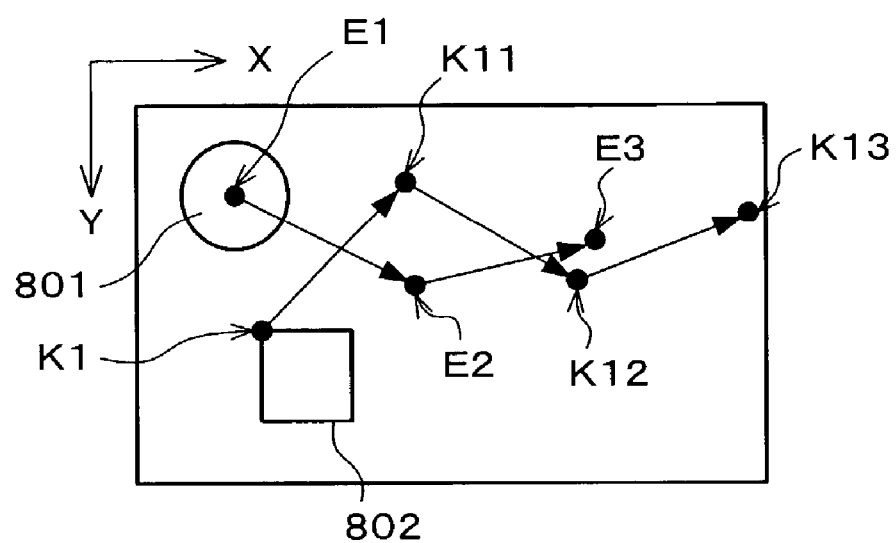
FIG. 17 is an explanatory view illustrating still another animation obtained by editing the animation shown in FIG. 4(a).

Moreover, it is possible to carry out the copying of the difference values by specifying the frames. For example, by copying the difference values of the position parameter of the rectangular object 802 to the frame 2 and the later frames of the object 802, the animation as shown in FIG. 17 is created.

Moreover, in this case, if movement velocity (speed) of the rectangular object 802 is to be set to be identical to that of the circle object 801, such movement speed is attained by editing such that K11 is at a position of 2 seconds after the start, and K13 is at a position of 5 seconds after the start, as shown in FIG. 18. In addition, the movement speed may not be taken in consideration.

As described above, the present animation editing apparatus is so established that the varying parameter extracting section 110 extracts, from the XML data, the varying parameter regarding the changes in conditions of the objects in the animation, and that the text editing section 105 modifies the thus extracted varying parameter in accordance with the user instruction, and updates the XML data by using the thus modified varying parameter. With this arrangement, it is possible to edit the animation in accordance with the user instruction.

As described above, the present animation editing apparatus is so established that only the varying parameter is selectively extracted out of the XML data. With this arrangement, it is possible to edit the animation more easily, compared with the case where the whole XML data is edited directly.

Moreover, the present animation editing apparatus is so arranged that the object for which the varying parameter is extracted can be specified by using the editing windows 701 and 702. In short, only the varying parameter regarding the object that is requested by the user can be extracted. With this arrangement, it is possible to reduce an amount of the varying parameter to be extracted, thereby making it possible to edit the animation more easily.

Moreover, the present editing apparatus is so arranged that the varying parameter extracted by the varying parameter extracting section 110 is displayed on the varying parameter window 703, and the text editing section 105 modifies the varying parameter on the window 703 in accordance with the user input. In short, the thus displayed varying parameter is directly modified. With this arrangement, the editing process of the animation is easier than the arrangement in which the parameter is changed by defining and selecting a command or an instance.

Moreover, the present animation editing apparatus is so established that the varying parameter displayed on the varying parameter window 703 is stored (copied) and modification of the varying parameter is carried out by using the varying parameter thus stored. Thus, the user can modify the varying parameter simply by using the stored value.

Moreover, when the animation is reproduced on the graphic editing window 702, the varying parameter extracting section 110 sequentially displays the values of the varying parameter of the object in the animation. This arrangement enables the user to follow how the varying parameter changes, so that the value (value of the parameter) to be used for the modification can be easily envisaged.

Note that, in the present embodiment, the varying parameter extracting section 110 extracts the varying parameter of the thus selected object and displays the varying parameter on the varying parameter window 703. However, in case objects are closely related to each other, the present invention is not limited to this.

Figure 19:
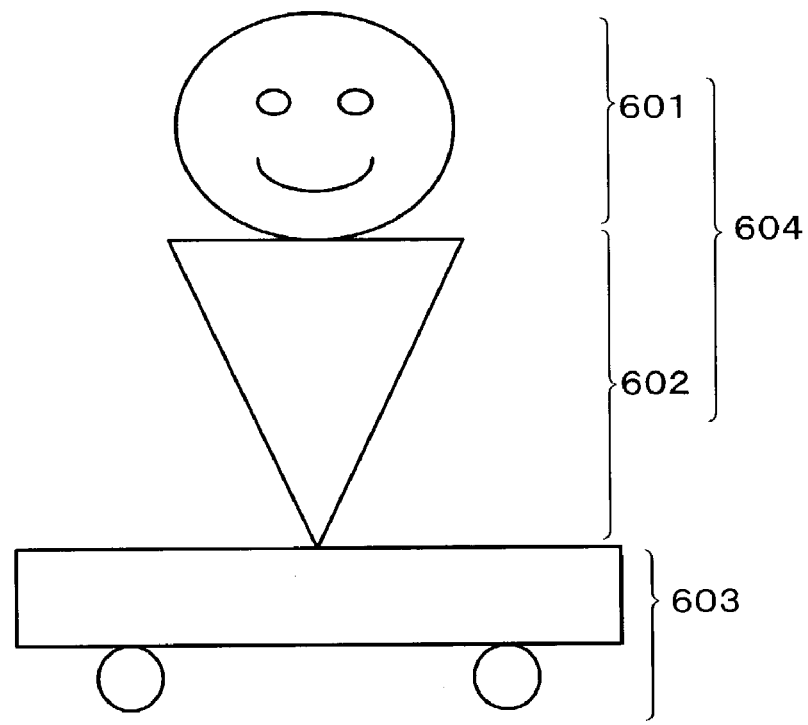
FIG. 19 is an explanatory view illustrating an example of frame image data.
Figure 20:
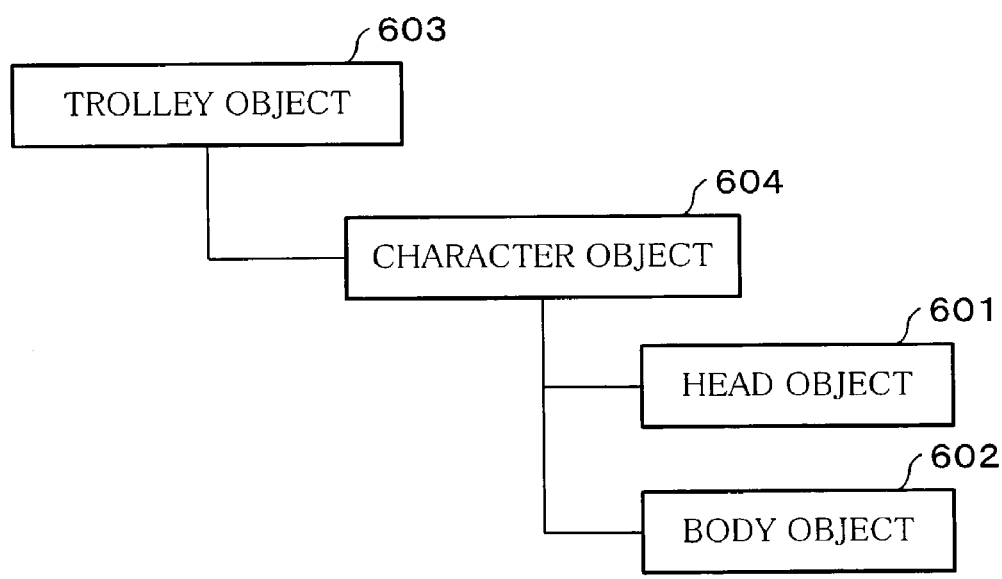
FIG. 20 is an explanatory view illustrating a data structure shown in FIG. 19.

For example, frame image data for a character object 604 composed of a head object 601 and a body object 602 is placed on a trolley object 603 as shown in FIG. 19 has a data structure (internal data structure) as shown in FIG. 20.

Specifically, in the frame image data, the character object 603 is a child object of the trolley object. Further, the head object 601 and the body object 602 are child objects of the character object 604.

In this case, a position parameter (movement) of the trolley object 603 has influence on a position parameter of the character object 604. Meanwhile, a position parameter of the character object 604 has influence on a position parameter of the head object 601 and the body object 602.

Therefore, when the head object 601 is selected, it is preferable that the varying parameter extracting section 110 draws its attention to (supervises) the position parameter of the character object 604 and the trolley object 603.

It is preferable that the varying parameter extracting section 110 is so established that in case the position parameter of the head object 601 is changed according how the position parameters of the objects 603 and 604 change, (in case the change in those of the objects 603 and 604 affect the positional parameter of the heat object 601), the change is displayed on the varying parameter window 703, even if there is no change as to the head object 601 itself.

Note that objects and tags (tags of the XML data) correspond to each other. Thus, it is easy to display (in a text format) on the text editing window 701 or the varying parameter window 703 a tag of a selected object, a tag of an object that influence thus selected object and its content (content of a parameter).

Moreover, in order to cause the circle object 801 to reach at the position shown in FIG. 4(*b*) at a time currently reproduced (reproduction time of the intervening frame; the time indicated by the slider 1105 of FIG. 8), the content of the frame 3 in the varying parameter information 1001 may be copied to the reproduction information 1002. By doing this, a key frame regarding the current reproduction time is newly generated. A result of the creation of the key frame reflects on the frame image data and the XML data. This arrangement realizes animation editing as desired.

Moreover, in the present embodiment the extracted varying parameters are listed on the varying parameter windows 703 as the varying parameter information 1001. However, the present embodiment is not limited to this. It may be so arranged that only the reproduction information 1002 is displayed on the varying parameter window 703.

In this case, for example, if the movement of the rectangular object 802 is to be set to be similar to that of the circle object 801, the following process is carried out. Specifically, all the varying parameters (positions) of the circle object 801 to be displayed in the reproduction information 1002. Then, the varying parameters (positions) of the rectangular object 802 are displayed as the reproduction information 1002, and the copied parameters are overwritten on the reproduction information 1002.

Moreover, in the present embodiment, discussed is the example where the varying parameters shown in the reproduction information 1002 on the varying parameter window 703 are modified. It may be so arranged as to modify the varying parameter information 1001. Moreover, it is possible to copy the content of the reproduction information 1002 onto part (or all) of the varying parameter information 1001. This arrangement realizes modification of a varying parameter of an existing frame. Moreover, in case the varying parameter information 1001 is temporarily stored (copied), it is possible to modify the content of the varying parameter information 1001 right before the copying.

Moreover, the varying parameter extracting section 110 may be so established as to extract only the varying parameters of the selected frame and the later frame. Further, it may be so arranged that the varying parameter extracting section 110 extracts only the varying parameters of the selected frame and frames before and after the selected frame. Moreover, the varying parameter extracting section 110 may be so established as to display, as the reproduction information 1002, the information other than the varying parameter, and as to be capable of editing the information other than the varying parameter.

Moreover, it may be so arranged that the extracted varying parameter and portion other than the extracted varying parameter are displayed together. In this case, it is preferable that the varying parameter has a display format different from that of the portion (such as the XML data displayed on the text editing window 701), in terms of size, color, font, letter modification (such as type face and letter character's line width) and the like of letter characters, thereby displaying the varying parameter with emphasis.

In short, the varying parameter extracting section 110 is preferably so established that the varying parameter information 1001 on the varying parameter window 703 is set (modified) to have a different display format than that of the text (XML data) of the text editing window 701. However, the setting (modification) is not inevitably necessary.

Moreover, the varying parameter extracting section 110 may be so established as to extract characteristic information or movement information of the object. Here, the characteristic information is a varying parameter regarding a change in the object not associated with movement of a central position of the object, meanwhile the movement information is a varying parameter regarding a change in the object associated with such movement of the central position of the object.

Moreover, it may be so arranged that the characteristic information is information regarding color or information regarding shape such as coordinate values of corners of a polygon, color of regions, and whether a plurality of points are jointed with a curve (for example sin function) or with a straight line. Further, it may be so arranged that the movement information is information regarding a difference in a coordinate value between frames.

Furthermore, the present embodiment is so arranged that the varying parameter extracting section 110 shows the reproduction time (time period of the reproduction) by using the reproduction timer 110. However, the present embodiment, which is not limited to this, may be so arranged that the reproduction time is shown by using a counter.

Moreover, it may be so arranged that the XML data includes a command for instructing to repeatedly reproduce a frame so that the varying parameter extracting section 110 extracts and displays the command on the varying parameter window 703.

With this arrangement, it is possible to edit the command (parameter of the command) in the same fashion as the varying parameter. Moreover, the command may be information regarding how the frames relate with each other, such as an animation in which an animation between specific frames is repeated in a specific number of time.

Moreover, in the present embodiment, the text data (XML data) in the XML (Extensible Markup Language) format is used as the animation prescription data. However, data capable of being used as the animation prescription data in the present animation editing apparatus is not limited to the XML data. In other words, the changing the content of the conversion dictionary 107 allows the present animation editing apparatus to use data in any format.

Especially, it is preferable that the present animation editing apparatus uses, as the animation prescription data, text data written in a strict rule. The use of such data realizes easy creation (preparation) of the conversion dictionary 107.

Here, it can be so put that the text data written in a strict rule is data whose data structure can be understood in a single meaning, and which is tagged with tags that are understandable to human, (so as to read an application).

Moreover, it is preferable that text data that is recognizable to the present animation editing apparatus is used as the animation prescription data.

Moreover, the user of the text data eliminates a need of converting the animation data or the varying parameter into a data format understandable to the user in order to display the animation prescription data or the varying parameter on the text editing window 701 or the varying parameter window 703. Therefore, the use of the text data has such an advantage that the use of the text data attains easy display of the data.

Moreover, in case the animation prescription data is not text data, it is preferable that the animation data or the varying parameter is converted into a data format understandable to the user, in order to display the animation prescription data or the varying parameter on the text editing window 701 or the varying parameter window 703.

Further, any type of reproduction engines may be used as the animation reproducing section 109 of the present animation editing apparatus. Moreover, if the reproduction engine is changed, it is preferable that the content of the conversion dictionary 107 is changed, as in the case the animation prescription data is changed.

Moreover, the frame image data (internal data) to be stored in the internal data memory storage 104 is a combination of the command code and the parameter. Therefore, the command code corresponding to the XML data is changed depending on the value of the parameter.

For example, in case of a circle object, if its radius parameter has a value of 5 cm or less, its command code has four controlling points (a circle having four controlling points is created).On the other hand, if its radius parameter has a value of 5 cm or more, its command code has eight controlling points (a circle having eight controlling points is created).

Moreover, in the present embodiment, the control section 102 is composed of a CPU. However, it may be so arranged that a single CPU constitutes the control section 102, the text editing section 105, the graphic editing section 106, the animation reproducing section 109, and the varying parameter extracting section 110 of the present animation editing apparatus.

Moreover, similarly, it may be so arranged that a single memory storage constitutes the internal data memory storage 104, the conversion dictionary 107, and the memory storage for temporarily storing the content of the varying parameter information 1001, the reproducing information 1002, and the difference information 1003, of the present embodiment.

Moreover, in the present animation editing apparatus, the animation reproducing section 109 creates, in accordance with the key frames, the image intervening between the key frames by interpolating, thereby creating the animation data. However, the present animation editing apparatus, which is not limited to this, may be so arranged that the animation is reproduced simply by using the still image data (frame image data) that is in accordance with the key frames.

Moreover, in the present embodiment, the animation reproducing section 109 creates the frame image data for the respective frames in the XML data, and the intervening image data for interpolating between the respective frames, and displays continuously (sequentially) the still image data of the frame image data for respective frames and the intervening image data per predetermined time.

In addition to this arrangement, the present animation editing apparatus may be so arranged that the animation reproducing section 109 interprets the XML data with a degree of freedom. This arrangement attains better interpolation and filtering in accordance with the XML data.

For example, in case the XML data stores that an object located at point A at 0 second is moved to point B at 3 second, and to point C at 5 second, the animation reproducing section 109 can, with this arrangement, create intervening image data for indicting that the object is at an intervening point (between points A and B) at 1 second.

Moreover, the animation reproducing section 109 creates such animation data in which the object at point B at 3 second is not displayed, for example. Further, it may be so arranged that a flag is provided in the XML data, the flag indicating that the degree of freedom is given to the data interpretation carried out by the animation reproducing section 109.

Further, it may be so arranged that a plurality of sets of animation data are prepared so that the animation reproducing section 109 can change the animation to display on the graphic editing window 702 in accordance with a user instruction to select the sets by mouse-clicking or the like operation.

Moreover, it may be so arranged that the animation reproducing section 109 creates animation data including a plurality sets of animation data. In other words, it may be so arranged that a plurality sets of animation data are created so that selected one(s) of the plurality sets of animation data by the user instruction to select is displayed.

Moreover, it may be so arranged that when creating the animation data in accordance with the XML data, the animation reproducing section 109 creates animation data in which a display sequence of the frame image data may be changed in the XML data, and specific frame image data is repeatedly displayed.

Moreover, it may be so arranged that the animation reproducing section 109 creates, as animation data, such data with which one still image data (frame image data or intervening image data) is overlapped on another still image data as displayed as such.

For example, by using still image data A, B, and C, still image data prepared by overlapping the still image data B on the still image data A as a background, may be set as single image data (A+B). Moreover, in this case, it is possible to create still image data (A+C) in which the still image data A is the background and the still image data C is overlapped thereon, substituting the still image data B.

Moreover, the animation reproducing section 109 can create, as the animation data, such animation data in which the still image data (A+B) and the still image data (A+C) are displayed sequentially.

In case such animation data is created, it may be so arranged that the animation reproducing section 109 prepares the still image data (A+B) and (A+C) in advance. Moreover, there may be created such animation that the still image data (A+B) and the still image data C are prepared, so that the still image data C is overlapped on the still image data (A+B) after the still image data (A+B) is displayed.

In short, the animation data of the present animation editing apparatus may be time-varying image data, which is obtained by replacing, with another still image data, still image data overlapped on still image data that is background.

Moreover, in the present embodiment, a time-varying image editing apparatus of the present invention is used as the apparatus (the present animation editing apparatus) for editing (creating/modifying) the animation by using the XML data as the animation prescription data.

However, the time-varying image editing apparatus of the present invention may edit and reproduce, not only animation, but also other time-varying image. It should be noted that the present animation editing apparatus is merely a preferable embodiment.

Examples of time-varying images that the time-varying image editing apparatus of the present invention can deal with are (a) actual still image data in data format, such as JPEG (Joint Photographic Expert Group), PNG (Portable Network Graphics), and BMP (Bitmap);and (b) time-varying image data including, per frame, one or more actual time-varying image data, such as MPEG (Motion Picture Expert Group) and AVI (Audio Video Interleaving). It is also possible for the time-varying image editing apparatus of the present invention to deal with time-varying image data in which an animation is mixed therein.

Moreover, an example of the prescription data that the time-varying image editing apparatus of the present invention is the SMIL (Synchronized Multimedia Integration Language), besides the XML data.

SMIL data is a markup (tagging) language in which an still image, a time-varying image, position of music data (time and layout) are written as XML subsets.

If the SMIL data is used, it is possible to specify, for example, to display the still (time-varying) image data in a region surrounded by coordinates A and B in a period between 3 seconds and 5 seconds after the start, or to display only an upper-half of the still (time-varying) image data. Further, it is also possible to specify to display a portion of the time-varying image (music) data between 2 second and 3 second, or to reproduce another time-varying image (music) data after a predetermined time from an end of the time-varying image (music) data.

As described above, for the SMIL data, the prescription data (display of the time-varying image) is created by following concept of object, but not concept of key frame. In the SMIL data, written is information indicating relationship between time and behavior (parameter) of an object (information indicating a parameter of the object at each time).

For this reason, the user select a time, in order to edit a time-varying image based on the SMIL data. In response to this, the time-varying image editing apparatus of the present invention extracts an object (or its parameter), which is so written that the object changes its behavior at the selected time (in short, the SMIL data has such a data structure with which such extraction is easily carried out).

Therefore, it is preferable that an object specifying section of the time-varying image editing apparatus of the present invention is capable of specifying, in accordance with a user instruction to select a time, an object whose varying parameter is to be extracted (the object having a parameter to be varied at the selected time).

Moreover, it is also possible that the SVG (Scalable Vector Graphics) data is used as the prescription data. The SVG data is also a markup language in which a two dimensional graphic is written as XML subsets. Similarly to the SMIL data, the SVG data allows easy extraction of the object or the parameter.

Shown in FIG. 21 is an example of the SVG data (this example is picked up from the specification form of the SVG).

In the data shown in FIG. 21, the bold portion is a portion (prime portion). A portion sandwiched between the bold characters is a portion (parameter-changed portion) in which a parameter of a rectangular shape is changed.

In the first tag "animate" of the parameter-changed portion, it is indicated that the variable (parameter) x is animated from 300 (from) to 0 (to) within a period between 0 second (begin) to 9 second (dur), and is frozen (fill) after the animation is ended. Moreover, in another "animate" tag, it is indicated that another variable is animated within a period between 0 second to 9 second.

The time-varying image editing apparatus of the present invention is so arranged that, in case the period between 0 and 9 is selected, the prime portion and the parameter-changed portion are extracted and displayed showing that the variables for the x, y, width, and height of "rect" in the prime portion have been changed, with color and layout of the variables changed and with indication as to how they are associated with each other.

Further, it is preferable that a frame image that is to be displayed at the selected time is displayed when the user selects the time. It is further preferable that in the image an object having a changed parameter is highlighted by changing a outer line of the object in terms of its line type or color.

Next, an example of the SMIL data is shown in FIG. 22. In the data, the "par" tags indicate that times of the "audio" tag and the "img" tag, which are sandwiched by the "par" tags are to go in parallel. Assuming the "par" tags have a starting time of t second, the "audio2 tag starts playing the "audio1" file from (t+6) second, and the "img" tag displays the "image1" file from (t+10) second, which is 4 seconds after the start of the "audio" tag as specified by the "id" attribute. In this case, the time-varying image editing apparatus (editor) of the present invention is so arranged that the "begin" attribute of the "img" tag is converted to "begin="10s"" and displayed. Here, it is possible to used a graphical display, such as a time sheet.

Moreover, for use of the prescription data in any one of the XML data, SMIL data, and SVG data, it is preferable that the time-varying image editing apparatus of the present invention extracts a variable indicating an interpolating method when creating the intervening frame, if the prescription data includes such variable.

For example, in case the prescription data includes a key frame in which an object moves from point A, point B to point C, an intervening frame created by interpolating with a straight line has different content as that created by interpolating with a curve line. Moreover, the content of the intervening frame is subjective to temporal interpolation, besides the positional interpolation.

Assume that there are a key frame for indicating a condition in which a ball bounds up maximally (top condition), and a key frame for indicating a condition in which a ball touches a ground (ground condition), for creating time-varying image data for a time-varying image in which a ball is bounding. In this case, the ball has a fastest speed in its ground condition, and a slowest speed in its top condition. Therefore, in this case, it is preferable that an interpolation curve for expressing the speed is prescribed in the prescription data (or that an attribute for deciding a type of the interpolation is included in the prescription data). Further, it is preferable that the time-varying image editing apparatus of the present invention extracts the interpolation curve (or the attribute) and creates the intervening frame in accordance with the interpolation curve (or the attribute).

Note that the specification forms of the SVG and the SMIL is available at the home page of W3C (World Wide Web Consortium) for browsing and downloading (SVG; http://www.w3.org/TR/2000/CR-SVG-20001102/ind ex.html, SMIL;http://www.w3.org/TR/REC-smil/).

Moreover, the present embodiment is so arranged that the editing process of the animation (creating process of the animation) of the present animation editing apparatus shown in FIG. 1 is carried out under control by the control section 102.

However, the present invention is not limited to this. It may be so arranged that a program for the animation editing process is stored in a recording medium, and an information processing apparatus capable of reading the program is used instead of the control section 102 (and further, the text editing section 105, the graphic editing section 106, and the animation reproducing section 109, and the varying parameter extracting section 110).

In this arrangement, an arithmetic unit (such as a CPU or an MPU (Micro Processing Unit) of the information processing apparatus reads the program stored in the recording medium, and carries out the animation editing process. Therefore, it can be said that the program itself realizes the animation editing process.

Here, as the information processing apparatus, a portable terminal apparatus, a feature expansion board or a feature expansion unit to be attached tot a computer can be used, beside a general computer (work station or a personal computer).

Moreover, the program is a program code (such as a program in execution form, an intermediate code program, and a source program) of software with which the animation editing process is realized. The program may be a program to be used solely or a program to be used in combination with another program (such as an OS (operation System)). Moreover, the program may be a program that is temporally stored in a memory (such as a RAM) in the apparatus after being read out of the recording medium, and then is read out again for execution.

Moreover, the recording medium for storing the program may be a recording medium that can be separated from the information processing apparatus easily, or may be a recording medium that is fixed (mounted) onto the apparatus. Further, the recording medium may be an external recording apparatus to be connected to the apparatus.

Applicable as such recording media are a magnetic tape, such as a video tape and a cassette tape; a magnetic disc such as a floppy disc and a hard disc; an optical disc (magneto-optical disc) such as a CD-ROM, an MO, an MD, a DVD, and a CD-R; a memory card such as an IC card and an optical card; and a semiconductor memory such as a mask ROM, an EPROM, and a flush ROM.

Moreover, it may be so arranged as to use a recording medium connected to the information processing apparatus via a network (such as the intranet and the internet). In this case, the information processing apparatus obtains the program by downloading it via the network. In other words, it may be so arranged that the program is obtained via a transmission medium (a medium for transmissively holding a program) of the network (that is connected to a wire or wireless line). In addition, it is preferable that a program for the downloading is stored in the apparatus in advance.

Moreover, the thumbnail display section 705 shown in FIG. 5 may have a function to display a thumbnail (a thumbnail group) of the frame image data that is in accordance with the XML data displayed on the editing window (prescription data display section) 701.

Furthermore, it may be so arranged that the slider 1105 is displayed on the reproducing timer 1100 (see FIG. 8) displayed on the varying parameter window 703, the slider 1105 indicating the time axis 1101, the positions T1 to T3 of the respective frames 1 to 3 on the time axis 1101, and the intervening frame that is currently being reproduced on the graphic editing window 702. Moreover, it is possible to express the animation editing apparatus of the present invention as an animation editing apparatus for editing a time-varying image by using prescription data including a parameter that prescribes a condition of an object in the time-varying image, the time-varying image editing apparatus including an input section for receiving a user instruction; an extracting section for extracting, from the prescription data, a varying parameter that regards a change in the condition of the object in the time-varying image; and a modifying section for modifying the thus extracted varying parameter in accordance with the user instruction, and updating the prescription data by using the thus modified varying parameter.

Furthermore, it is possible to express the present invention as a transmission medium for transmissively transmitting a computer program for an animation editing process for editing an animation by using prescription data including a parameter that prescribes a condition of an object in the animation, the transmission medium transmissively transmitting a computer program for the animation editing process, wherein the computer program is so established as to extract, from the prescription data, a varying parameter that regards a change in the condition of the object in the animation, modify the thus extracted varying parameter in accordance with the user instruction, and update the prescription data by using the thus modified varying parameter.

As described above, a time-varying image editing apparatus (the present editing apparatus) of the present invention for editing a time-varying image by using prescription data including a parameter that prescribes a condition of an object in the time-varying image, is provided with an input section for receiving a user instruction; an extracting section for extracting, from the prescription data, a varying parameter that regards a change in the condition of the object in the time-varying image; and a modifying section for modifying the thus extracted varying parameter in accordance with the user instruction, and updating the prescription data by using the thus modified varying parameter.

The present editing apparatus is an apparatus for editing a time-varying image (such as an animation and the like) by using computer graphics. It is generally so arranged that the time-varying image is created in accordance with data that prescribes a shape or movement of an object in the image (an object displayed in the image; character). Thus, the present editing apparatus is so arranged as to use the prescription data so as to edit the time-varying image.

Especially, the present editing apparatus is so arranged as to use the extracting section so as to extract, from the prescription data, the varying parameter that regards the change in the condition of the object in the time-varying image.

To say specifically, parameters that prescribe a shape, movement, a color or the like of the respective objects are generally written in the prescription data. Moreover, some of the parameters of the objects are changed in accordance with the change in the condition of the objects in the time-varying image (such as positions of the objects), while others that have no relation with the change, are not to be varied (such as names of the objects). The present editing apparatus is so arranged that a parameter to be varied is extracted, as a varying parameter, from the prescription data.

Then, the modifying section modifies the extracted varying parameter in accordance with a user instruction. Further, the modifying section updates the prescription data of the time-varying image by using the thus modified varying parameter. With this arrangement, it is possible to edit the time-varying image in accordance with the user instruction.

As described above, the present editing apparatus is so established as to selectively extract only the varying parameter from the prescription data. With this arrangement, it is possible to edit the time-varying image more easily than an arrangement in which the whole prescription data is directly edited.

Moreover, it is preferable that the present editing apparatus is provided with an object specifying section for specifying, in accordance with the user instruction, an object whose varying parameter is to be extracted, and the extracting section is so established as to extract the varying parameter of the object specified by the object specifying section.

With this arrangement, it is possible to extract only the varying parameter that regards the object that is requested by the user. Thus, it is possible to reduce an amount of the varying parameter to be extracted, thereby attaining easier editing of the time-varying image.

Moreover, in the arrangement, it is preferable that the present editing apparatus is provided with a prescription data display section for displaying the prescription data. Further, it is preferably so arranged that a user can select one (or a plurality) of objects via the input section by using the thus displayed prescription data.

Furthermore, it is preferable that the object specifying section is so established as to specify the thus selected object as an object whose varying parameter is to be extracted. This arrangement enables the user to easily select the object which he requests.

Moreover, in the arrangement, it may be so adopted that the present editing apparatus is provided with an image display section for displaying an image (a time-varying image or part (still image) of a time-varying image) that is in accordance with the prescription data. In this case, it is preferably so arranged that a user can select one (or a plurality) of objects via the input section by using the thus displayed image.

Furthermore, it is preferable that the object specifying section is so established as to specify the thus selected object as an object whose varying parameter is to be extracted. This arrangement also enables the user to easily select the object that he requests.

Moreover, in this case, it is preferable that the image display section includes a conversion dictionary for creating, from the prescription data, an image. In the conversion dictionary, the grammar of the prescription data and the grammar of the image data (data composed of codes for displaying the image) are written in such a manner that the grammars correspond to each other. This makes it easier to realize the aforementioned arrangement.

Furthermore, with such an arrangement that the conversion dictionary is exchangeable, use of a conversion dictionary that is in accordance with a changed format of the prescription data or the image data ensures easy image creation, even if the format of the prescription data or the image data is changed.

Moreover, it may be so arranged that the present editing apparatus is provided with a varying parameter display section for displaying the varying parameter thus extracted by the extracting section. In this case, it is preferable that the modifying section is so established as to modify, in accordance with a user input, the varying parameter, and cause the varying parameter display section to display the thus modified varying parameter.

With this arrangement, the displayed varying parameter is directly modified. Thus, it is possible to carry out the editing process of the time-varying image more easily than the arrangement in which the parameter is changed by defining and selecting the command or instance.

Moreover, in this case, it is preferable that there provided is a memory storage for storing thereon the varying parameter that has been displayed on the varying parameter display section. It is further preferable that the modifying section is so established as to be capable of modifying the varying parameter by using content stored in the memory storage.

This arrangement allows the user to modify the varying parameter simply by instructing the modifying section to use a value stored in (copied to) the memory storage. In other words, it is not necessary to input, by using an input apparatus such as a keyboard or the like, how each varying parameter is to be modified.

With this arrangement, it is possible to significantly facilitate easy modification of the varying parameter, in case an amount of modification (an amount of the varying parameter to be modified) is so much.

Moreover, it may also be so arranged that all varying parameters of a given object are stored so that the varying parameters can be used as varying parameters of another object. With this arrangement, it is possible to very easily cause the different objects to have identical varying parameters.

Moreover, in case the time-varying image (time-varying image in accordance with the prescription data) is displayed on the image display section, it is preferable that the varying parameter display section is so established as to sequentially display values of the varying parameter of the object in the time-varying image. This arrangement allows the user to follow how the varying parameter is changed, thus enabling the user to easily envisage the value (value of the parameter) to be used for the modification.

Moreover, it is preferable that the varying parameter display section is so established as to display the varying parameter in a display format different from a display format in which the prescription data display section displays the prescription data, when displaying the varying parameter. Here, the display format includes a size, color, font, letter modification (such as type face and letter character's line width) of letter characters, for example. With this arrangement, it is possible to display the varying parameter with emphasis.

Furthermore, the present editing apparatus is preferably arranged such that data in a text format is used as the prescription data. This arrangement eliminates a need of converting the prescription data or the varying parameter, which is part of the prescription data, so as to be data having a format that is recognizable to the user. This attains easy display of the data.

Moreover, a time-varying image editing method (the present editing method) of the present invention for editing a time-varying image by using prescription data including a parameter that prescribes a condition of an object in the time-varying image, includes the steps of extracting, from the prescription data, a varying parameter that regards a change in the condition of the object in the time-varying image; modifying the thus extracted varying parameter in accordance with a user instruction; and updating the prescription data by using the thus modified varying parameter.

The present editing method is an editing method used by the present editing apparatus described above. Specifically, the present editing method is so arranged that, in the step of extracting, the varying parameter that regards the change in the condition of the object in the time-varying image is extracted from the prescription data.

Then, in the step of the modifying, the thus extracted varying parameter is modified in accordance with the user instruction. Furthermore, in the step of updating, the prescription data of the time-varying image is updated by using the thus modified varying parameter. With this arrangement it is possible to edit the time-varying image in accordance with the user instruction.

As described above, the present editing method is so established as to selectively extract only the varying parameter from the prescription data. With this arrangement, it is possible to edit the time-varying image more easily than the case where the whole prescription data is directly edited.

Moreover, a recording medium of the present invention storing thereon a computer program for a time-varying image editing process for editing a time-varying image by using prescription data including a parameter that prescribes a condition of an object in the time-varying image, the recording medium storing thereon a computer program being operable to effect the process of extracting, from the prescription data, a varying parameter that regards a change in the condition of the object in the time-varying image; modifying the thus extracted varying parameter in accordance with a user instruction; and updating the prescription data by using the thus modified varying parameter.

It is possible to easily realize the aforementioned present editing apparatus and the present editing method by causing a control apparatus of a general information processing apparatus, such as a personal computer and the like, to read the recording medium.

Moreover, the internal data memory storage 104 shown in FIG. 2 may be a text data memory storage, which is composed of a RAN or the like, for storing thereon data that is edited by the input section 101 and is necessary for the reproduction of the animation. Moreover, the internal data memory storage 104 may store thereon information such as a command code or a parameter of the present animation editing apparatus.

Furthermore, the text editing section 105 may be so arranged as to (a) reflect a change in text to the internal data memory storage 104 by referring to the conversion dictionary 107, and (b) display a text to which the change in the content of the internal data memory storage 104 is reflected, by being controlled by the control section 102, and by referring to the conversion dictionary 107, when the graphic editing section 106 changes the internal data memory storage section 104.

Further, the graphic editing section 106 may be controlled by the control section 102, and graphically display the content of the internal data memory storage 104 on the display section 103 so as to allow to edit the content. Furthermore, the graphic editing section 106 may be so arranged as to (a) reflect a change in a graphic to the internal data memory storage 104, and (b) display a graphic to which the change in the content of the internal data memory storage 104 is reflected, by being controlled by the control section 102 and by referring to the conversion dictionary 107, when the text editing section 105 changes the internal data.

Moreover, the conversion dictionary 107 may be a prescription data-use memory storage section in which a corresponding table for the grammar of the text and the graphic is stored. Furthermore, the present animation editing apparatus may be provided with a text/graphic converting section for synchronizing, with the internal data memory storage 104, the content of the editing carried out by the editing sections 105 and 106, by referring to the conversion dictionary 107.

Moreover, the varying parameter extracting section 110 may be so arranged as to extract text data including a parameter that regards the movement, and display the text data on the display section 103. Furthermore, the varying parameter extracting section 110 may be so arranged as to extract text data including a parameter that affects a specified object (attributes such as position, color and the like), and displays the text data on the display section 103. Moreover, it is also possible to arranged such that one or a plurality of only the attributes such as position, color and the like are extracted. In addition, it is more preferable to specify on the text data than specifying graphically. On the text data, the specifying is easily carried out simply by specifying tags.

Moreover, it can be said that FIGS. 3 and 4 show a display image of the present animation editing apparatus. Furthermore, in the present embodiment (FIG. 3 and the like), it can be said that a beginning tag and an ending tag of the XML data correspond to each other sequentially, and the ending tag is spelled out by adding "/" in front of the spelling of the beginning tag.

Further, in case such an animation that the circle object 801 moves from E1, E2, to E3, and at the same time the rectangular object 802 moves from K1, K2, to K3 as shown in FIG. 4(a), is to be created, it may be so arranged that a frame is created by using the tool bar 706, and the frame is selected by using the control button group 704 or the thumbnail display section 705. Moreover, it may be so arranged that a dialog for inputting, in a text format, the time between the frames is established, when creating the frames as shown in FIGS. 4(b) to 4(d). In addition, it may be so arranged that the thumbnail display section 705 is provided with a scroll bar for controlling the time between the frames.

Moreover, the text editing window 701 shown in FIG. 5 may be so arranged as to display text data so that the animation is edited in text (by using mainly a keyboard). Further, the graphic editing window 702 may be so arranged as to display a graphic so that the animation is edited by a GUI (by using mainly a mouse). Furthermore, the varying parameter window 703 may be so arranged as to extract a text portion, which changes attribute information, which is position information, color, or the like, of an object specified by the editing windows 701 and 702, and to display the text portion.

It can be said that FIG. 6 is a view to explain regions displayed on the varying parameter window 703. Moreover, it may be so arranged that the varying parameter regarding the circle in the respective frames is extracted and displayed by selecting the circle tag in case of the text editing window 701, or a graphic of the circle in case of the graphic editing window 702, so that a portion regarding the positional change of the circle as shown in FIG. 6 is the varying parameter information 1001.

Moreover, as shown in FIG. 7, it may be so arranged that in the intervening frame currently displayed during the reproduction of the animation, an interpolating value of a tag extracted as the varying parameter information 1001 is displayed in the reproduction information 1002, while a frame displayed in the varying parameter information 1001, and a difference between the respective frames of the reproduction information 1002 are displayed in the difference information 1003.

Moreover, it can be said that FIG. 1 is a view schematically illustrating a process flow of the present animation editing apparatus. Moreover, it may be so arranged that as S201 the user locates an object such as a point, a line, and the like, in a plurality of key frames by using the input section 101, and the control section 103 updates data of the internal data memory storage 104 in accordance with editing data of the text editing section 105 or the graphic editing section 106, in response to the input of the input section 101.

Furthermore, it may be so arranged that, at S206 in FIG. 1(a), the control section 102 sends input data of the selected object to the varying parameter extracting section 110, so that the varying parameter extracting section 110 supervises a parameter regarding the object, and (b) the parameter for interpolating the key frames and displays on the display section 103 the parameter to be varied.

Moreover, in case the varying parameter is not aligned as the varying parameter information 1001 shown in FIG. 7, it is possible to realize copying of the movement by providing a menu for copying the whole content of the object displayed in the reproduction information 1002. In addition, in case the case the varying parameter is aligned as the varying parameter information 1001, it is possible to carry out the copying after performing the editing process.

Furthermore, in case the rectangular shape in the frame 2 is copied so that the difference value is copied onto the rectangular shape, vectors of movement from K1, K11, K12, to K13, as shown in FIG. 17, are copied. Here, if speed of the movement is also to be copied, the updating is performed so that, as shown in FIG. 18, K11 is a position for 2 seconds after the start, and K13 is a position for 5 seconds after the start. Values of the frames may be updated with the speed of the movement ignored.

Moreover, as to the command, for example, for repeating frames, it is possible to change the command in terms of a parameter such as a number of the repeating, as the parameter for the coordinate, and the like are varied. Here, in order to indicate which frame the repeating is continued, it can be so put that something that can be an ID, for example, a frame number, is written.

Moreover, it can be said that the method of the Japanese publication of unexamined patent application, Tokukaihei, No. 7-44729 is an animation creating method for dialogically creating an animation method for changing a display of a graphic symbol in conjunction with movement of an instance, the instance being of an object-oriented program and defining parts of apparatus to be designed, the instance corresponding to the graphic symbol. Furthermore, this system, which is for object-oriented programming, is not so friendly to an ordinary user, which is not of skill, in order to create and operate a model. Moreover, this publication does not describe a method with which a user easily specifies a location at which the editing is carried out, and a method of displaying the location.

Moreover, the apparatus of the Japanese publication of unexamined patent application, Tokukaihei, No. 9-167251 is an apparatus for analyzing a sentence inputted in a natural language so as to obtain words constituting the sentence and a relationship between the words, and obtain an animation-creating command for each word thus obtain, and creating an animation in accordance with the commands. For this apparatus, it is possible to reuse the command edited by registering into the dictionary. However, it is necessary to edit a command for detailed editing, even though the editing of command is harder to understand than the editing in text.

Moreover, it can be said that the XML is not only readable to human because the XML is written in text, but is capable of expressing general data in a versatile data description language in a format which the application can deal with, because the data is tagged with the tags indicating the content.

Moreover, it can be said that the present invention has an object to make an animation creating apparatus capable of (a) reusing part of data from a file written in a data description language that is text-based and can be easily read and edited (by an ordinary user), and that can be used in a reproduction engine having a different format, whose typical example is the XML, and (b) creating an animation by editing a parameter with ease.

Furthermore, in the present embodiment, the image data is data composed of command codes of the reproduction engine. Here, assuming that a graphical symbol located at point A at 0 second moves to point B at 3 second, and to point C at 5 second, the reproduction engine can create such an intervening frame in which the graphical symbol locates between points A and B at 1 second, and can have such a display in which the graphical symbol is not displayed at point B at 3 second. In short, the reproduction engine has a degree of freedom as to how the image data is interpreted (even though there is a case a flag is provided to show whether or not the degree of freedom is given to the image data, and is capable of interpolating and filtering. The command code of the reproduction engine of the present animation editing apparatus includes such case.

Moreover, in the present embodiment, the animation data is data to display still image data per predetermined time, continuously (sequentially). Here, for example assume that there are still images A, B, and C so that the still image A is set to be a background, and the still image B is overlapped on the still image A in a first frame, and the still image B is replaced with the still image C while keeping the still image A as the background. In this case, the animation data may be so arranged that an image (A+B) and an image (A+C) are prepared in advance. However, the animation data may so arranged as to include time-varying image data in which the image (A+B) and an image C are prepared in advance so that the image C is overlapped on the image (A+B) after the image (A+B) is displayed. In short, the animation data includes such time-varying image obtained by a processing method of an image for such display.

Further, in the present embodiment, the animation is edited by editing the still image data use for the animation. In addition to this, the present animation editing apparatus is capable of causing, for example, animation data of a viewer of a television to be data with which another animation data is referred on a window displayed on the television. Specifically, it is possible to create such animation that animations of channel 1 and channel 2 are prepared and any one of the animation can be referred or changed by clicking a mouse. Moreover, it is possible to deal with other than content of the frames, such as the sequence of the frames or repeating of third to fifth frames twice, and the like.

Moreover, examples of the time-varying image that can be used in the time-varying image editing apparatus of the present invention are data in which actual still image data such as the JPEG, PNG, and BMP or actual time-varying image data such as the MPEG and AVI is provided solely or in plurality per frame. It is possible to include animation in those data. Furthermore, in case of the SMIL data, it is possible to specify such that another time-varying image (music) data is reproduced after a certain second from an end of time-varying image (music) data. Further, the SMIL is in concept of objects, but not concept of key frames. Thus, the SMIL describes, for example, that an object acts like this during a period from a certain second to a certain second.

Therefore, by selecting a time as described in the present embodiment instead of selecting a key frame, it is possible to extract an object or its parameter, which is written so that its action (parameter) is changed at the time (because the SMIL has a data structure, which allows such extraction.

In FIG. 21, shown is a data structure written in the grammar of the SVG (Scalable Vector Graphics) instead of that of the SMIL, which allows extraction (the SMIL and SVG are similar to each other in terms of animation). When using this data, if a time between 0 second and 9 second is selected (then, preferably a frame image to be displayed at the time is displayed, and a changed object is highlighted by its outer line with a changed line type or color), it is preferable that bold letters and a portion sandwiched between the bold letters are extracted, and the change of the variables of the x, y, width, and height in the bold "rect" is displayed with a color, layout, and the like changed, in such a manner that the relationship between the variables are also shown.

Moreover, if there is a variable that specifies the interpolating method when creating the intervening frame, it is preferably so arranged that the variable is also extracted. For example, in case where there are key frames in which a graphical symbol moves from point A, point B to point C, an intervening frame for interpolating with a straight line is different from that for interpolating with a curve line. Not only interpolating as to position, but also interpolating as to time is changed. Specifically, in case of an animation in which a ball is bounding, having a key frame in which the ball bounds up maximally, and a key frame for in which a ball touches a ground, the ball has a fastest speed when touching the ground, and a slowest speed when bounding up maximally. Thus, an interpolating curve is specified so as to display the speed (or there is an attribute to decide a type of the interpolating).

Moreover, the present invention may be expressed as the following first to ninth animation creating apparatuses, and first recording medium.

Namely, the first animation creating apparatus is provided with an analyzing means for analyzing text data written in a fixed and strict rule; an obtaining means for obtaining a command (or a parameter condition) necessary for creating an animation obtained by the analyzing means; an extracting means for extracting, from the text data, a text group regarding constitutional elements (characteristic information and movement information) of the animation in accordance with the command obtained by the obtaining means; a text editing means for editing the text group extracted by the extracting means; and an animation creating means for creating the animation in accordance with the command obtained by the obtaining means.

Moreover, the second animation creating means (which can deal with another animation reproduction engine), including the same elements as the first animation creating apparatus, is so arranged that the obtaining means is provided with a dictionary in which a corresponding between the text in accordance with the rule and the command (or the parameter condition) for creating the animation is registered, and obtains the command (or the parameter condition) referring to the dictionary.

Furthermore, the third animation creating apparatus (which can specify an object), including the same elements as the first animation creating apparatus, is further provided with a specifying means for arbitrarily specifying one or a plurality of the animation constituting elements, and the text group that regards the specified one or plurality of the animation constituting elements is limited in accordance with an extracting result of the extracting means.

Further, the fourth animation creating apparatus, including the same elements as the first animation creating apparatus, is so arranged that the extracted text group is displayed in a color, font, size, and the like changed in accordance with the constituent element or an amount of the change, when reproducing and editing the animation.

Moreover, the fifth animation creating apparatus, including the same elements as the first animation creating apparatus, is so arranged that how an amount of change in the constituent element is changed is displayed dynamically by using a counter, a slider, or the like, when reproducing and editing the animation.

Furthermore, the sixth animation creating apparatus, including the same elements as the first animation creating apparatus, is provided with a graphic display means for graphically displaying an editing result made by the text editing means.

Further, the seventh animation creating apparatus, including the same elements as the first animation creating apparatus, is further provided with a graphic editing means for graphically editing a graphic displayed on the graphic display means, so as to reflect an editing result made by the graphic editing means to the text data.

Moreover, the eighth animation creating apparatus, including the same elements of the first animation creating apparatus, is further provided with a display means for displaying the one or plurality of the key frames of the animation.

Further, the ninth animation creating apparatus, including the same element as the eighth animation creating apparatus, has such an arrangement capable of listing and displaying texts extracted for the animation including the plurality of the key frames, and copying all the texts at once in such a manner that the texts are copied in accordance with a rule by referring to the dictionary.

Furthermore, the first recording medium is a computer-readable recording medium storing thereon a program including an instruction to cause a computer to execute an analyzing means for analyzing, in accordance with a strict rule, a data memory storage region storing thereon the strict rule, and input data written in a text in accordance with the strict rule, and obtaining a text group of texts constituting the data and relationship between the texts, an obtaining means for obtaining, from the text group thus obtained by the analyzing means, a command (or a parameter condition) for creating an animation, an extracting means for extracting, from the text group thus obtained by the analyzing means, a text group regarding constituent elements (characteristic information and movement information) of the animation, and a creating means for creating the animation in accordance with the command (or the parameter condition) obtained by the obtaining means.

According to the present invention, the aforementioned object is attained by an animation creating apparatus is provided with an analyzing means for analyzing text data written in a strict rule such as the XML; an obtaining means for obtaining a command (or a parameter condition) necessary for creating an animation obtained by the analyzing means; an extracting means for extracting, from the text data, a portion that regards constitutional elements (characteristic information and movement information) of the animation; a text editing means for editing part of the text data extracted by the extracting means; and an animation creating means for creating the animation in accordance with the command obtained by the obtaining means.

The analyzing means corresponds to a parser in the XML. Because sentences are in accordance with the strict rule, it is easier to obtain a structure and content of the sentences, compared with analysis of a natural language. The analyzing means, for example, reads a text file simply from a top, creates, as internal data, an object corresponding to tags in accordance with the rule, and inputs tagged content as a parameter value. Moreover, the analyzing means may be so arranged as not to perform conversion as to tags regarding a function not in the reproduction engine. Moreover, the obtaining means obtains (or converts), from the internal data, the command or parameter for instructing the animation reproduction engine.

The aforementioned first to ninth animation creating apparatuses can deal with a reproduction engine having a different format, by being provided with the obtaining means for the command (or the parameter condition) necessary for creating the animation obtained by the analyzing means. Further, the aforementioned first to ninth animation creating apparatus are preferably provided with (a) a transmitting means for transmitting inputted text data via a medium such as a floppy disc, optical communication, telephone communication, and the like, and (b) a receiving means for receiving the text data via the medium from another apparatus.

In addition, the first to ninth animation creating apparatuses are capable of accessing to a most suitable dictionary, with such an arrangement that the dictionary (the dictionary provided to the second animation creating apparatus) in which the corresponding between the text in accordance with the rule and the command (or the parameter condition) for creating the animation is registered, is provided in a server on a network such as the Web, so that a URL, version information of a rule, or the like is described in text data, so that a version of a rule, reproduction engine type, and a version of animation reproduction engines are transmitted, even for a different animation reproduction engine.

Moreover, the first to ninth animation creating apparatuses display the text data (source data) regrinding the object, which is selected in the image, when the object is selected. In the first to ninth animation creating apparatuses, the animation can be modified by editing the thus displayed data.

Namely, easy specifying of a portion to be edited by the user is attained by displaying data regarding the movement of the thus selected object, for example, by using the scroll bar or a counter, or in a different alignment. Moreover, because the text is inputted, it is possible to accurately input, for example, for adjusting positions.

Furthermore, for an animation to be reproduced in a plurality of frames, it is possible to display, in a list, texts regarding a selected object, by selecting the object. This allows to copy, cut, and paste the texts as a whole at once. For example, it is possible to copy, to key frames 7 to 9, an animation that is in key frames 1 to 3. In this case, it may be so arranged that the key frames 1 and 7, the key frames 2 and 8, and the key frames 3 and 9 respectively correspond to each other, regardless of temporal differences between the key frames, and that a key frame is created in accordance with a time of the key frame from which the copying is done, when pasting it on the key frame 7.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

As described above, an editing apparatus (present editing apparatus) of the present invention is so arranged that a varying parameter regarding a change in a condition of an object in a time-varying image is extracted from prescription data, the thus extracted varying parameter is modified in accordance with a user instruction, and the prescription data of the time-varying image is updated by using the thus modified varying parameter. With this arrangement, the time-varying image can be edited in accordance with the user instruction. Therefore, the present editing apparatus can be suitably used in editing an animation by using computer graphics.

What is claimed is:

1. A time-varying image editing apparatus for editing a time-varying image by using prescription data including a parameter that prescribes a condition of an object in the time-varying image, the time-varying image editing apparatus comprising:
   an input section for receiving a user instruction;
   an extracting section for extracting, from the prescription data, a varying parameter that regards a change in the condition of the object in the time-varying image; and
   a modifying section for modifying the thus extracted varying parameter in accordance with the user instruction, and updating the prescription data by using the thus modified varying parameter.

2. A time-varying image editing apparatus as set forth in claim 1, comprising:
   an object specifying section for specifying, in accordance with the user instruction, an object whose varying parameter is to be extracted,
   the extracting section being so established as to extract the varying parameter of the object specified by the object specifying section.

3. A time-varying image editing apparatus as set forth in claim 2, comprising:
   a prescription data display section for displaying the prescription data,
   the object specifying section being so established as to specify, in accordance with a user selection instruction regarding an object indicated in the thus displayed prescription data, an object whose varying parameter is to be extracted.

4. A time-varying image editing apparatus as set forth in claim 3, comprising:
   an image display section for displaying an image that is in accordance with the prescription data,
   the object specifying section being so established as to specify, in accordance with a user selection instruction regarding an object in the thus displayed image, an object whose varying parameter is to be extracted.

5. The time-varying image editing apparatus as set forth in claim 4, wherein:
   the image display section includes a conversion dictionary for creating, from the prescription data, an image.

6. A time-varying image editing apparatus as set forth in claim 4, comprising:
   a varying parameter display section for displaying the varying parameter thus extracted by the extracting section,
   the modifying section being so established as to modify, in accordance with a user input, the varying parameter, and cause the varying parameter display section to display the thus modified varying parameter.

7. A time-varying image editing apparatus as set forth in claim 6, comprising:
a memory storage for storing thereon the varying parameter that has been displayed on the varying parameter display section,
the modifying section being so established as to be capable of modifying the varying parameter by using content stored in the memory storage.

8. The time-varying image editing apparatus as set froth in claim 6, wherein:
the image display section is so established as to be capable of displaying the time-varying image in accordance with the prescription data, and
the varying parameter display section is so established as to sequentially display values of the varying parameter of the object in the time-varying image.

9. The time-varying image editing apparatus as set forth in claim 6, wherein:
the varying parameter display section is so established as to display the varying parameter in a display format different from a display format in which the prescription data display section displays the prescription data.

10. The time-varying image editing apparatus as set forth in claim 6, wherein:
the prescription data is data in a text format.

11. The time-varying image editing apparatus as set forth in claim 1, wherein:
the time-varying image is an animation.

12. The time-varying image editing apparatus as set forth in claim 4, wherein:
the prescription data is composed of a plurality of frames that correspond to a plurality of still images, and
the image display section is so established as to (a) create frame image data and intervening image data, the frame image data being data of the still images that respectively correspond to the frames of the prescription data, the intervening image data being still image data of an intervening frame for interpolating between the respective frames, (b) create time-varying image data for displaying the frame image data and the intervening image data continuously per a predetermined time, and then (c) display the time-varying image data as the time-varying image.

13. A time-varying image editing apparatus as set forth in claim 12, comprising:
a varying parameter display section for displaying the varying parameter thus extracted by the extracting section,
the extracting section being so established as to:
(a) extract the varying parameter of the thus specified object, and cause the varying parameter display section to display the thus extracted varying parameter as varying parameter information, and
(b) detect a difference value in the thus extracted varying parameter between the respective frames, and cause the varying parameter display section to display the difference value as difference information.

14. The time-varying image editing apparatus as set forth in claim 17, wherein:
the extracting section is so established as to cause the varying parameter display section to display, sequentially and as reproduction information, values of the varying parameter in the intervening image data and the frame image data that are displayed on the image display section, the values of the varying parameter regarding the thus specified object.

15. The time-varying image editing apparatus as set forth in claim 14, wherein:
the modifying section is so established as to modify the prescription data, in accordance with a user modification instruction regarding the varying parameter information, reproduction information, or the difference information.

16. The time-varying image editing apparatus as set forth in claim 2, wherein:
the prescription data is composed of information indicating relationship between a time and a parameter of the object, and
the object specifying section is so established as to specify, in accordance with user selection instruction to select a time, an object having a parameter regarding the time, as the object whose varying parameter is to be extracted.

17. A time-varying image editing method for editing a time-varying image by using prescription data including a parameter that prescribes a condition of an object in the time-varying image, comprising the steps of:
extracting, from the prescription data, a varying parameter that regards a change in the condition of the object in the time-varying image;
modifying the thus extracted varying parameter in accordance with a user instruction; and
updating the prescription data by using the thus modified varying parameter.

18. A time-varying image editing method for editing a time-varying image by using prescription data including a parameter that prescribes a condition of an object in thetime-varying image, the time-varying image editing method causing a computer to execute the process of:
extracting, from the prescription data, a varying parameter that regards a change in the condition of the object in the time-varying image;
modifying the thus extracted varying parameter in accordance with a user instruction; and
updating the prescription data by using the thus modified varying parameter.

19. A time-varying image editing program for use in a computer of a time-varying image editing apparatus for editing a time-varying image by using prescription data including a parameter that prescribes a condition of an object in the time-varying image, the time-varying image editing program causing the computer to function as:
an extracting section for extracting, from the prescription data, a varying parameter that regards a change in the condition of the object in the time-varying image; and
a modifying section for modifying the thus extracted varying parameter in accordance with a user instruction, and updating the prescription data by using the thus modified varying parameter.

20. A recording medium storing thereon a computer program for a time-varying image editing process for editing a time-varying image by using prescription data including a parameter that prescribes a condition of an object in the time-varying image, the recording medium storing thereon a computer program being operable to effect the process of:
extracting, from the prescription data, a varying parameter that regards a change in the condition of the object in the time-varying image;
modifying the thus extracted varying parameter in accordance with a user instruction; and
updating the prescription data by using the thus modified varying parameter.

21. A method for editing a time-varying image including an object, wherein a condition of the object is prescribed by prescription data including at least one parameter, comprising the steps of:

extracting from the prescription data a varying parameter that varies with a change in the condition of the object in the time-varying image;

modifying the extracted varying parameter in accordance with a user instruction; and updating the prescription data with the modified varying parameter.

* * * * *

UNITED STATES PATENT AND TRADEMARK OFFICE
CERTIFICATE OF CORRECTION

PATENT NO.        : 7,071,942 B2
APPLICATION NO.   : 10/296906
DATED             : July 4, 2006
INVENTOR(S)       : Hiroaki Zaima et al.

Page 1 of 1

It is certified that error appears in the above-identified patent and that said Letters Patent is hereby corrected as shown below:

Title Page, item [54] and col. 1, should read -- DEVICE FOR EDITING ANIMATION, METHOD FOR EDITING ANIMATION, PROGRAM FOR EDITING ANIMATION, RECORDED MEDIUM WHERE COMPUTER PROGRAM FOR EDITING ANIMATION IS RECORDED --

Signed and Sealed this

Second Day of January, 2007

JON W. DUDAS
*Director of the United States Patent and Trademark Office*